US011949858B2

(12) United States Patent
Masule et al.

(10) Patent No.: US 11,949,858 B2
(45) Date of Patent: Apr. 2, 2024

(54) VIDEO THROUGHPUT IMPROVEMENT USING LONG TERM REFERENCING, DEEP LEARNING, AND LOAD BALANCING

(71) Applicant: QUALCOMM Incorporated, San Diego, CA (US)

(72) Inventors: Aniket Anil Masule, Sangli (IN); Rajeshwar Kurapaty, Hyderabad (IN); Vikash Garodia, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/895,232

(22) Filed: Jun. 8, 2020

(65) Prior Publication Data

US 2021/0385443 A1 Dec. 9, 2021

(51) Int. Cl.
*H04N 19/114* (2014.01)
*H04N 19/139* (2014.01)
*H04N 19/177* (2014.01)

(52) U.S. Cl.
CPC ......... *H04N 19/114* (2014.11); *H04N 19/139* (2014.11); *H04N 19/177* (2014.11)

(58) Field of Classification Search
None
See application file for complete search history.

(56) References Cited

U.S. PATENT DOCUMENTS

| 9,071,814 | B1 * | 6/2015 | Fan ..................... H04N 19/177 |
| 2010/0111180 | A1 | 5/2010 | Gao et al. |
| 2017/0078574 | A1 * | 3/2017 | Puntambekar ..... H04N 5/23254 |
| 2019/0045217 | A1 | 2/2019 | Gokhale et al. |
| 2019/0273948 | A1 * | 9/2019 | Yin ........................ G06N 3/045 |
| 2019/0289359 | A1 * | 9/2019 | Sekar ................. H04N 21/4333 |
| 2020/0272903 | A1 * | 8/2020 | Rippel ................... H04N 19/42 |
| 2021/0195206 | A1 * | 6/2021 | Hannuksela ........... H04N 19/30 |

FOREIGN PATENT DOCUMENTS

| WO | WO-2019115865 A1 | 6/2019 |
| WO | WO-2019197715 A1 | 10/2019 |

OTHER PUBLICATIONS

International Search Report and Written Opinion—PCT/US2021/034070—ISA/EPO—dated Sep. 8, 2021 (200897WO).

* cited by examiner

*Primary Examiner* — Samuel D Fereja
(74) *Attorney, Agent, or Firm* — Polsinelli

(57) ABSTRACT

Methods, systems, and devices for improved video throughput using deep learning video coding are described. A device may receive a bitstream including a set of video frames. The device may batch the set of video frames into a first subset of video frames and a second subset of video frames based on a change in a reference scene associated with the set of video frames. The device may select a mode of operation for a neural processing unit of the device based on the batching. The device may generate a set of video packets including the first subset of video frames, the second subset of video frames, or both, based on the neural processing unit and the selected mode of operation.

26 Claims, 13 Drawing Sheets

ND LOAD BALANCING

BACKGROUND

The following relates generally to video processing, and more specifically to improved video throughput using deep learning video coding.

Multimedia systems are widely deployed to provide various types of multimedia communication content such as voice, video, packet data, messaging, broadcast, and so on. These multimedia systems may be capable of processing, storage, generation, manipulation and rendition of multimedia information. Examples of multimedia systems include entertainment systems, information systems, virtual reality systems, model and simulation systems, and so on. These systems may employ a combination of hardware and software technologies to support processing, storage, generation, manipulation and rendition of multimedia information, for example, such as capture devices, storage devices, communication networks, computer systems, and display devices.

Some devices may provide various types of communication content such as audio (e.g., voice), video, etc. For example, some devices may support audio and video streaming over a network (e.g., a fourth generation (4G) network such as Long-term Evolution (LTE) network, a fifth generation (5G) network which may be referred to as a New Radio (NR) network, etc.). In some cases, existing approaches may fail to efficiently use device hardware for such communication content. Improved techniques to reduce hardware idle times, increase throughput of communication content, and decrease communication content processing overhead, etc. may be desired.

SUMMARY

The described techniques relate to improved methods, systems, devices, and apparatuses that support improved video throughput using deep learning video coding. For example, the described techniques may be used to configure a device to support efficient video processing (e.g., via efficient utilization of one or more neural processing units by a device for video processing). For example, the described techniques may be used to configure the device to divide incoming frames of a bitstream into separate batches for processing (e.g., for parallel processing) by video hardware and neural processing unit hardware of the device. The device may determine batch sizing based on scene changes associated with the frames (e.g., based on changes in motion vector information associated with the frames), where the batch sizing may provide load balancing for processing the frames (e.g., load balancing between the processing by video hardware and neural processing unit hardware).

In some aspects, the neural processing unit hardware may operate in a training mode or a generation mode. The device may set the neural processing unit hardware to the training mode or the generation mode based on motion vector information associated with one or more frames (e.g., such as based on scene changes or changes in a reference scene). For example, the neural processing unit hardware may operate in the training mode for a number of frames at the beginning of each scene change. During the training mode, the video hardware may decode and generate frames from the bitstream while the neural processing unit receives the decoded frames as input for training. In the generation mode, the neural processing unit may generate frames (e.g., predicted frames (P-frames), Bidirectional frames (B-frames)) based on previously generated frames (e.g., intra predicted frames (I-frames), P-frames, B-frames, or long-term reference frames previously generated by the video hardware and/or the neural processing unit). A decoder of the device may determine when to switch modes of the neural processing unit based on, for example, header information associated with the frames.

A method of video processing at a device is described. The method may include receiving a bitstream including a set of video frames, batching the set of video frames into a first subset of video frames and a second subset of video frames based on a change in a reference scene associated with the set of video frames, selecting a mode of operation for a neural processing unit of the device based on the batching, and generating a set of video packets including the first subset of video frames, the second subset of video frames, or both, based on the neural processing unit and the selected mode of operation.

An apparatus for video processing at a device is described. The apparatus may include a processor, memory coupled with the processor, and instructions stored in the memory. The instructions may be executable by the processor to cause the apparatus to receive a bitstream including a set of video frames, batch the set of video frames into a first subset of video frames and a second subset of video frames based on a change in a reference scene associated with the set of video frames, select a mode of operation for a neural processing unit of the device based on the batching, and generate a set of video packets including the first subset of video frames, the second subset of video frames, or both, based on the neural processing unit and the selected mode of operation.

Another apparatus for video processing at a device is described. The apparatus may include means for receiving a bitstream including a set of video frames, batching the set of video frames into a first subset of video frames and a second subset of video frames based on a change in a reference scene associated with the set of video frames, selecting a mode of operation for a neural processing unit of the device based on the batching, and generating a set of video packets including the first subset of video frames, the second subset of video frames, or both, based on the neural processing unit and the selected mode of operation.

A non-transitory computer-readable medium storing code for video processing at a device is described. The code may include instructions executable by a processor to receive a bitstream including a set of video frames, batch the set of video frames into a first subset of video frames and a second subset of video frames based on a change in a reference scene associated with the set of video frames, select a mode of operation for a neural processing unit of the device based on the batching, and generate a set of video packets including the first subset of video frames, the second subset of video frames, or both, based on the neural processing unit and the selected mode of operation.

Some examples of the method, apparatuses, and non-transitory computer-readable medium described herein may further include operations, features, means, or instructions for identifying a long-term reference frame of the set of video frames, where batching the set of video frames into a first subset of video frames and a second subset of video frames may be based on identifying the long-term reference frame. Some examples of the method, apparatuses, and non-transitory computer-readable medium described herein may further include operations, features, means, or instructions for generating the first subset of video frames using a video processing unit of the device, and generating the second subset of video frames using the neural processing unit of the device, where the generated set of video packets includes the generated first subset of video frames and the generated second subset of video frames.

In some examples of the method, apparatuses, and non-transitory computer-readable medium described herein, generating the second subset of video frames using the neural processing unit may include operations, features, means, or instructions for generating a first frame of the second subset of video frames based on a long-term reference frame of the set of video frames. In some examples of the method, apparatuses, and non-transitory computer-readable medium described herein, generating the set of video packets may include operations, features, means, or instructions for synchronizing the first subset of video frames, the second subset of video frames, or both, based on temporal information associated with the first subset of video frames and the second subset of video frames.

Some examples of the method, apparatuses, and non-transitory computer-readable medium described herein may further include operations, features, means, or instructions for outputting the set of video packets based on the synchronization. In some examples of the method, apparatuses, and non-transitory computer-readable medium described herein, generating the set of video packets may include operations, features, means, or instructions for generating the first subset of video frames over a first time duration, and generating the second subset of video frames over a second time duration, the first time duration at least partially overlapping in time with the second time duration.

In some examples of the method, apparatuses, and non-transitory computer-readable medium described herein, selecting the mode of operation for the neural processing unit may include operations, features, means, or instructions for identifying the change in the reference scene, and selecting a training mode for the neural processing unit based on the identified change in the reference scene. Some examples of the method, apparatuses, and non-transitory computer-readable medium described herein may further include operations, features, means, or instructions for decoding the first subset of video frames by a video processing unit of the device, and training a learning model associated with the neural processing unit during the training mode based on at least one decoded video frame of the decoded first subset of video frames.

Some examples of the method, apparatuses, and non-transitory computer-readable medium described herein may further include operations, features, means, or instructions for selecting a generation mode for the neural processing unit based on a frame count satisfying a threshold, the frame count including a number of frames following the identified change in the reference scene. Some examples of the method, apparatuses, and non-transitory computer-readable medium described herein may further include operations, features, means, or instructions for decoding the first subset of video frames using a video processing unit of the device, and generating, using the neural processing unit of the device, at least one video frame of the second subset of video frames during the generation mode based on at least one decoded video frame of the decoded first subset of video frames.

Some examples of the method, apparatuses, and non-transitory computer-readable medium described herein may further include operations, features, means, or instructions for determining to switch the mode of operation for the neural processing unit from the training mode to the generation mode based on header information associated with one or more frames of the set of video packets. Some examples of the method, apparatuses, and non-transitory computer-readable medium described herein may further include operations, features, means, or instructions for training a learning model associated with the neural processing unit based on the first subset of video frames processed by a video processing unit of the device.

Some examples of the method, apparatuses, and non-transitory computer-readable medium described herein may further include operations, features, means, or instructions for estimating motion vector information associated with the set of video frames, and identifying the change in the reference scene based on the motion vector information and a learning model associated with the neural processing unit. In some examples of the method, apparatuses, and non-transitory computer-readable medium described herein, estimating the motion vector information of the set of video frames may include operations, features, means, or instructions for determining a difference between first motion vector information associated with a first video frame of the set of video frames and second motion vector information associated with a second video frame of the set of video frames, where identifying the change in the reference scene may be based on the determined difference.

Some examples of the method, apparatuses, and non-transitory computer-readable medium described herein may further include operations, features, means, or instructions for batching the set of video frames may be performed by a decoder of the device. Some examples of the method, apparatuses, and non-transitory computer-readable medium described herein may further include operations, features, means, or instructions for identifying a long-term reference frame of the set of video frames based on an accuracy threshold, the long-term reference frame including an intra-frame of the set of video frames. In some examples of the method, apparatuses, and non-transitory computer-readable medium described herein, the long-term reference frame may be identified by an encoder of the device.

DETAILED DESCRIPTION

Figure 1:
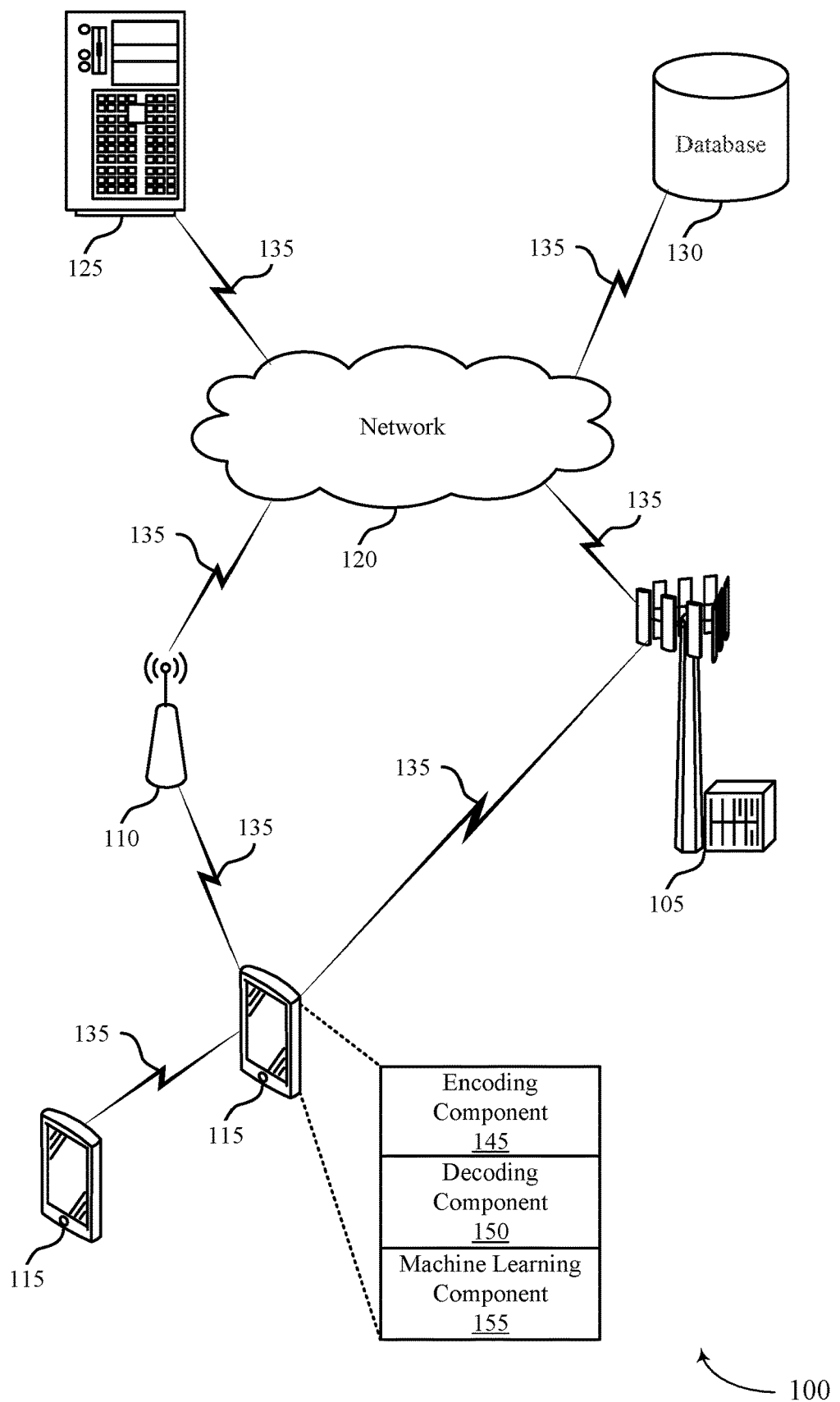
FIG. 1 illustrates an example of a system for video processing that supports improved video throughput using deep learning video coding in accordance with aspects of the present disclosure.

Some devices may support various types of communication content, for example, such as audio or video streaming over a network (e.g., a fourth generation (4G) network such as Long-term Evolution (LTE) network, as well as a fifth generation (5G) network which may be referred to as a New Radio (NR) network). In some examples, video streaming may include encoding and decoding video data, which may include one or more of intra-predicted frames (I-frames), predicted-frames (P-frames), or bi-directional frames (B-frames). Some approaches may fail to efficiently use device hardware when encoding and decoding video data. For example, some approaches may experience high latency and increased overhead when processing high resolution and high frames per second (fps) data. Improved techniques to reduce hardware idle times, increase video throughput (e.g., fps), and decrease video processing overhead may be desired.

According to the techniques described herein, a device may be configured to support efficient video processing by introducing parallel processing for frame generation using a video subsystem (e.g., video hardware) and neural processing (e.g., one or more neural processing units). For example, the described techniques may be used to configure the device to divide (e.g., batch, categorize, split, etc.) incoming frames of a bitstream into separate batches for processing (e.g., parallel processing) by video hardware and neural processing unit hardware of the device. The device may determine batch sizing based on scene changes associated with the frames (e.g., based on changes in motion vector information associated with the frames), which may provide load balancing for processing the frames by the video hardware and the neural processing unit hardware. As such, efficient utilization of neural processing unit hardware (e.g., as described herein) for processing of some communication content (e.g., such as video) may provide for reduced processing latency (e.g., less latency from hardware interrupts and interrupt handling via parallel processing of batches), increased throughput (e.g., higher fps data via efficient balancing of processing loads), etc.

In some aspects, the neural processing unit hardware may operate in a training mode or a generation mode. The device may set the neural processing unit hardware to the training mode or the generation mode based on motion vector information (e.g., scene changes) associated with one or more frames. For example, the neural processing unit hardware may operate in the training mode for a number of frames at the beginning of each scene change. During the training mode, the video hardware may decode and generate frames from the bitstream while the neural processing unit receives the decoded frames as input for training. In the generation mode, the neural processing unit may generate frames (e.g., P-frames, B-frames) based on previously generated frames (e.g., I-frames, P-frames, B-frames, or long-term reference frames previously generated by the video hardware and/or the neural processing unit). A decoder of the device may determine when to switch modes of the neural processing unit based on, for example, header information associated with the frames.

In an example, a device may receive a bitstream including a set of video frames. The device may include a video processing unit and a neural processing unit. The device may batch the set of video frames into a first subset of video frames and a second subset of video frames based on a change in a reference scene (e.g., based on motion vector information) associated with the set of video frames. In an example, the device may select a mode of operation for the neural processing unit based on the batching. The device may generate the first subset of video frames using the video processing unit and generate the second subset of video frames using the neural processing unit. The device may generate and output a set of video packets including the subsets of video frames.

Aspects of the disclosure are initially described in the context of a multimedia system. Aspects of the disclosure are then described with reference to example process flows, a temporal layer diagram, and a neural processing unit cluster diagram. Aspects of the disclosure are further illustrated by and described with reference to apparatus diagrams, system diagrams, and flowcharts that relate to improved video throughput using deep learning video coding.

FIG. 1 illustrates an example of a system 100 that supports improved video throughput using deep learning video coding in accordance with aspects of the present disclosure. The system 100 may include a base station 105, an access point 110, a device 115, a server 125, and a database 130. The base station 105, the access point 110, the device 115, the server 125, and the database 130 may communicate with each other via a network 120 using communications links 135. In some examples, the system 100 may support video frame encoding and decoding using a learning model and a neural processing unit, thereby providing enhancements to video processing, video communication, and video streaming applications.

The base station 105 may wirelessly communicate with the device 115 via one or more base station antennas. The base station 105 described herein may include or may be referred to by those skilled in the art as a base transceiver station, a radio base station, a radio transceiver, a NodeB, an eNodeB (eNB), a next-generation Node B or giga-nodeB (either of which may be referred to as a gNB), a Home NodeB, a Home eNodeB, or some other suitable terminology. The device 115 described herein may be able to communicate with various types of base stations and network equipment including macro eNBs, small cell eNBs, gNBs, relay base stations, and the like. The access point 110 may be configured to provide wireless communications for the device 115 over a relatively smaller area compared to the base station 105.

The device 115 may, additionally or alternatively, include or be referred to by those skilled in the art as a user equipment (UE), a user device, a cellular phone, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the device 115 may also be able to communicate directly with another device (e.g., using a peer-to-peer (P2P) or device-to-device (D2D) protocol). The device 115 described herein may be able to communicate with another device 115, for example, via a communications link 135.

The device 115 may incorporate aspects for improved video throughput using deep learning video coding. The techniques described herein may support integration of a learning model (e.g., a machine learning network, a neural network, a long short-term memory (LSTM) network, or a convolutional neural network) with video encoding and decoding, for example, associated with video processing and video streaming over a network. The device 115 may include an encoding component 145, a decoding component 150, and a machine learning component 155. The encoding component 145, the decoding component 150, and the machine learning component 155 may be implemented by aspects of a processor, for example, such as a processor 940 described in FIG. 9.

The machine learning component 155 may support a learning model, for example, a machine learning network, a neural network, a deep neural network, an LSTM network, or a convolutional neural network. The machine learning component 155 may also be referred to as a neural processing unit or neural processing unit hardware. The encoding component 145, the decoding component 150, and the machine learning component 155 may be implemented in a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), and/or the like.

In some examples, the device 115 may receive a bitstream including a set of video frames. The device 115 may include a video processing unit (e.g., video hardware) and a neural processing unit (e.g., machine learning component 155). The device 115 may batch (e.g., using the decoding component 150) the set of video frames into a first subset of video frames and a second subset of video frames based on a change in a reference scene (e.g., based on motion vector information) associated with the set of video frames. In some cases, motion vector information may refer to data parts (e.g., pixels) of one or more images or frames that change from a frame T to a frame T+1. In some cases, such batch processing may provide for less interrupts that are generated from the hardware which may reduce the latency introduced in interrupt handling.

In an example, the device 115 may select a mode of operation for the neural processing unit (e.g., machine learning component 155) based on the batching. The device 115 may generate the first subset of video frames using the video processing unit and generate the second subset of video frames using the neural processing unit. The device 115 may generate and output a set of video packets including the subsets of video frames. Generally, the neural processing unit hardware (e.g., which may include one or more neural processing units) may operate in a training mode or a generation mode (e.g., based on the batching). In a training mode, the neural processing unit hardware may learn the change in the motion vectors (e.g., where input may be taken from video hardware). In a generation mode, the neural processing unit hardware may generate YUV frames (e.g., where the input to neural processing unit hardware at time T is the YUV frame generated by neural processing unit hardware at T−1).

The network 120 may provide encryption, access authorization, tracking, Internet Protocol (IP) connectivity, and other access, computation, modification, and/or functions. Examples of the network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G) for example), etc. The network 120 may include the Internet.

The server 125 may include any combination of a data server, a cloud server, a proxy server, a mail server, a web server, an application server, a map server, a road assistance server, database server, a communications server, a home server, a mobile server, or any combination thereof. The server 125 may also transmit to the device 115 a variety of information, such as instructions or commands relevant to bandwidth usage during video communications. The database 130 may store data that may include instructions or commands related to video communications. The device 115 may retrieve the stored data from the database 130 via the base station 105 and/or the access point 110.

The communications links 135 shown in the system 100 may include uplink transmissions from the device 115 to the base station 105, the access point 110, or the server 125, and/or downlink transmissions, from the base station 105, the access point 110, the server 125, and/or the database 130 to the device 115, or between multiple devices 115. The downlink transmissions may also be called forward link transmissions while the uplink transmissions may also be called reverse link transmissions. The communications links 135 may transmit bidirectional communications and/or uni-directional communications. Communications links 135 may include one or more connections, including but not limited to, 345 MHz, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

Figure 2:
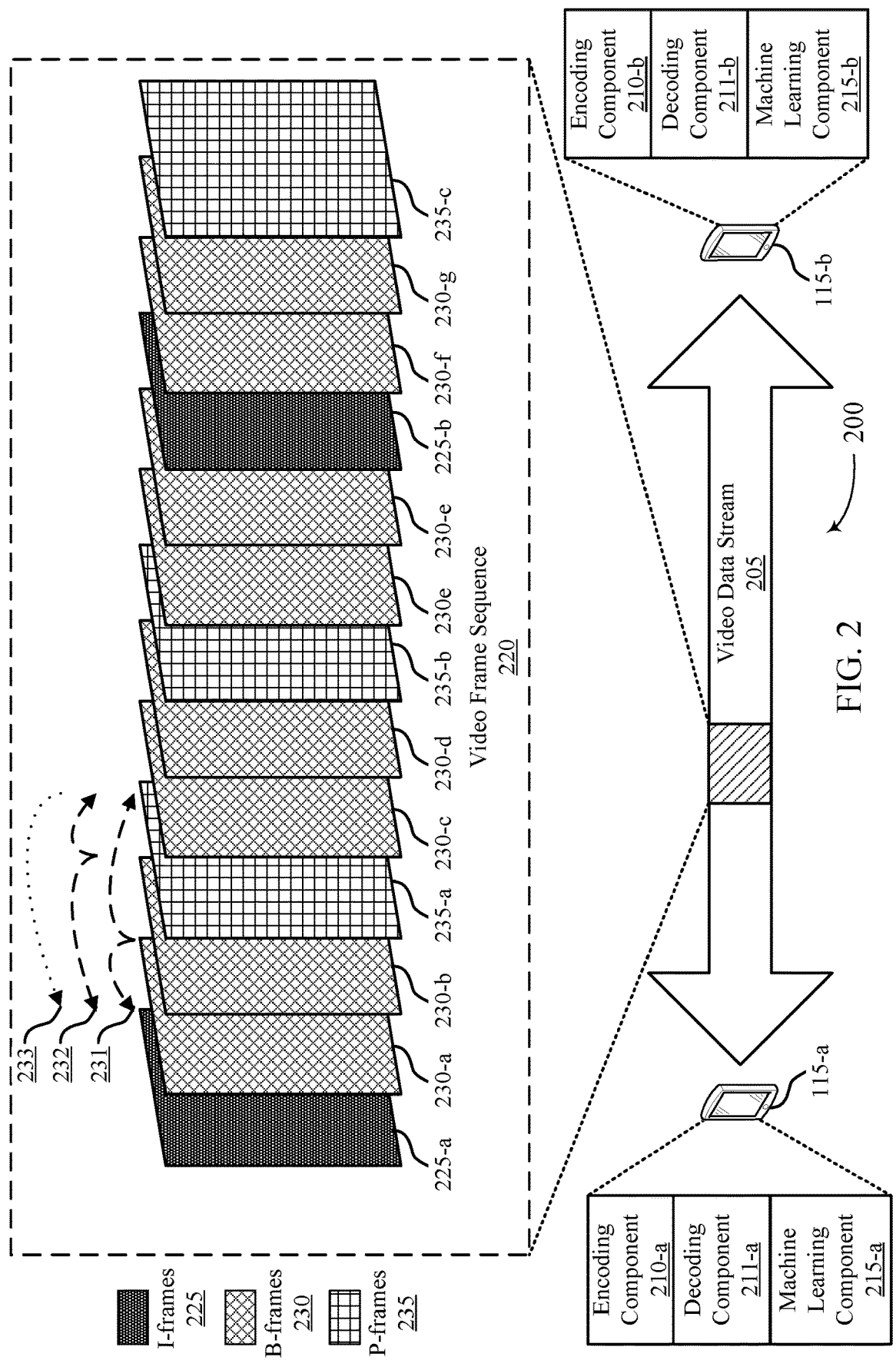
FIG. 2 illustrates an example of a system that supports improved video throughput using deep learning video coding in accordance with aspects of the present disclosure.

FIG. 2 illustrates an example of a system 200 that supports improved video throughput using deep learning video coding in accordance with aspects of the present disclosure. In some examples, the system 200 may support video frame encoding and decoding using a learning model, in accordance with aspects of the present disclosure. The system 200 may implement aspects of the system 100, such as providing improvements to video frame rendering and video throughput using deep learning video coding. For example, the system 200 may include a device 115-a and a device 115-b, which may include examples of aspects of devices 115 as described with reference to FIG. 1.

The device 115-a may establish a connection with the device 115-b for video communication or video streaming over a network, for example, such as 4G systems, 5G systems, Wi-Fi systems, and the like. The connection may be a bi-directional connection between the device 115-a and the device 115-b. Each of the device 115-a and the device 115-b may include encoding components, decoding components, and a learning network. The encoding components and decoding components may be integrated with the learning network.

For example, the device 115-*a* may include an encoding component 210-*a*, a decoding component 211-*a*, and a machine learning component 215-*a* (e.g., one or more neural processing units). In some examples, the device 115-*b* may include an encoding component 210-*b*, a decoding component 211-*b*, and a machine learning component 215-*b* (e.g., one or more neural processing units). The machine learning component 215-*a* and the machine learning component 215-*b* may include examples of aspects of the machine learning component 155 described herein. In some aspects, the encoding component 210-*a* and the decoding component 211-*a* may each be integrated with the machine learning component 215-*a*. In some examples, the encoding component 210-*b* and the decoding component 211-*b* may each be integrated with a machine learning component.

In some examples, during video processing and/or video communication, the device 115-*a* may capture video, compress (quantize) video frames of the captured video, generate a set of video packets carrying the video frames, and transmit a video data stream 205 to the device 115-*b*, for example, over a video connection. The device 115-*a* may encode (e.g., compress) video frames and packetize the encoded video frames using an encoding component 210-*a*. The video data stream 205 may include I-frames 225, B-frames 230, and P-frames 235. I-frames 225, B-frames 230, and P-frames 235 may be included in a video frame sequence 220. In some aspects, the device 115-*a* may transmit a video data stream 205 to the device 115-*b* based on video stored on the device 115-*a* (or stored on a memory coupled to the device 115-*a*). For example, the device 115-*a* may compress (quantize) video frames of the stored video, generate a set of video packets carrying the video frames, and transmit a video data stream 205 to the device 115-*b*, for example, over a video connection. In some cases, the device 115-*a* may include a base station or access point communicating or streaming communication content to the device 115-*b*.

I-frames 225 may include complete image information associated with the captured video. The I-frames 225 may be frames formatted based on an image file format, for example, a bitmap image format. For example, the I-frames may be frames formatted based on a joint photographic experts group (JPEG) format, a Windows bitmap format (BMP), a graphics interchange format (GIF), etc. In some cases, I-frames 225 may include intra macroblocks.

B-frames 230 may be bidirectional frames predicted from two reference frames. For example, B-frame 230-*a* and B-frame 230-*b* may be predicted based on a preceding reference frame (e.g., I-frame 225-*a*) and a following reference frame (e.g., P-frame 235-*a*), as indicated by the arrows at 231 and 232, respectively. In some aspects, prediction of a B-frame 230 based on a reference frame on which the B-frame 230 depends (e.g., an I-frame 225, a B-frame 230, or a P-frame 235) may follow decoding of the reference frame (e.g., out of order decoding). B-frames 230 may include intra macroblocks, predicted macroblocks, or bi-predicted macroblocks.

P-frames 235 may be frames predicted based on a preceding reference frame, for example, a preceding I-frame 225 or a preceding P-frame 235. For example, the P-frame 235-*a* may be predicted based on the I-frame 225-*a*, as indicated by the arrow at 233. In some aspects, the P-frames 235 may include motion vector information (e.g., motion displacement vector information, such as motion displacement vector information relative to a previous frame) and may include image data. In an example, the P-frame 235-*a* may include changes in an image based on a preceding frame, for example, the I-frame 225-*a*. In an example where the video frame sequence 220 is associated with a moving object and a stationary background, the P-frames 235 (e.g., the P-frame 235-*a*) may include image data associated with movement of the object, without including image data associated with the stationary background (e.g., without including image data associated with unchanging or stationary background pixels). In some aspects, the P-frames 235 may be referred to as delta-frames. P-frames 235 may include intra macroblocks or predicted macroblocks.

In some aspects, the device 115-*b* may receive the video data stream 205 and generate a set of video frames from the video data stream 205. For example, the device 115-*b* may decode the video stream 205 (e.g., decode packets of the video data stream 205) using the decoding component 211-*b*, and in some examples, generate one or more of the I-frames 225, B-frames 230, and P-frames 235 of the video frame sequence 220 from decoding the video data stream 205. In some aspects, the device 115-*b* may output video frames (e.g., I-frames 225, B-frames 230, P-frames 235) for display at the device 115-*b*, for example, via a display of the device 115-*b*. Both the device 115-*a* and the device 115-*b* may encode and transmit as described herein. In some aspects, both the device 115-*a* and the device 115-*b* may receive and decode as described herein.

In some aspects, video streams including high-resolution video (e.g., 1080p, 4K resolution, 8K resolution, etc.) may result in relatively large amounts of data to be transmitted in the video streams. For example, transmitting the video data stream 205 (e.g., the I-frames 225, B-frames 230, and P-frames 235 of the video frame sequence 220) may include transmitting relatively large amounts of data over a network (e.g., the network 120), for example, when the video data stream 205 includes high-resolution video. The improved methods, systems, devices, and apparatuses described herein for improved video throughput and reduced latency using deep learning video coding may introduce frame batching, parallel processing, and load balancing for frame generation using video hardware of a device 115 and neural processing (e.g., a machine learning component 215) of the device 115. Examples of aspects of frame batching, parallel processing, and load balancing are further described herein, for example, with reference to FIGS. 3 through 5.

Figure 3:
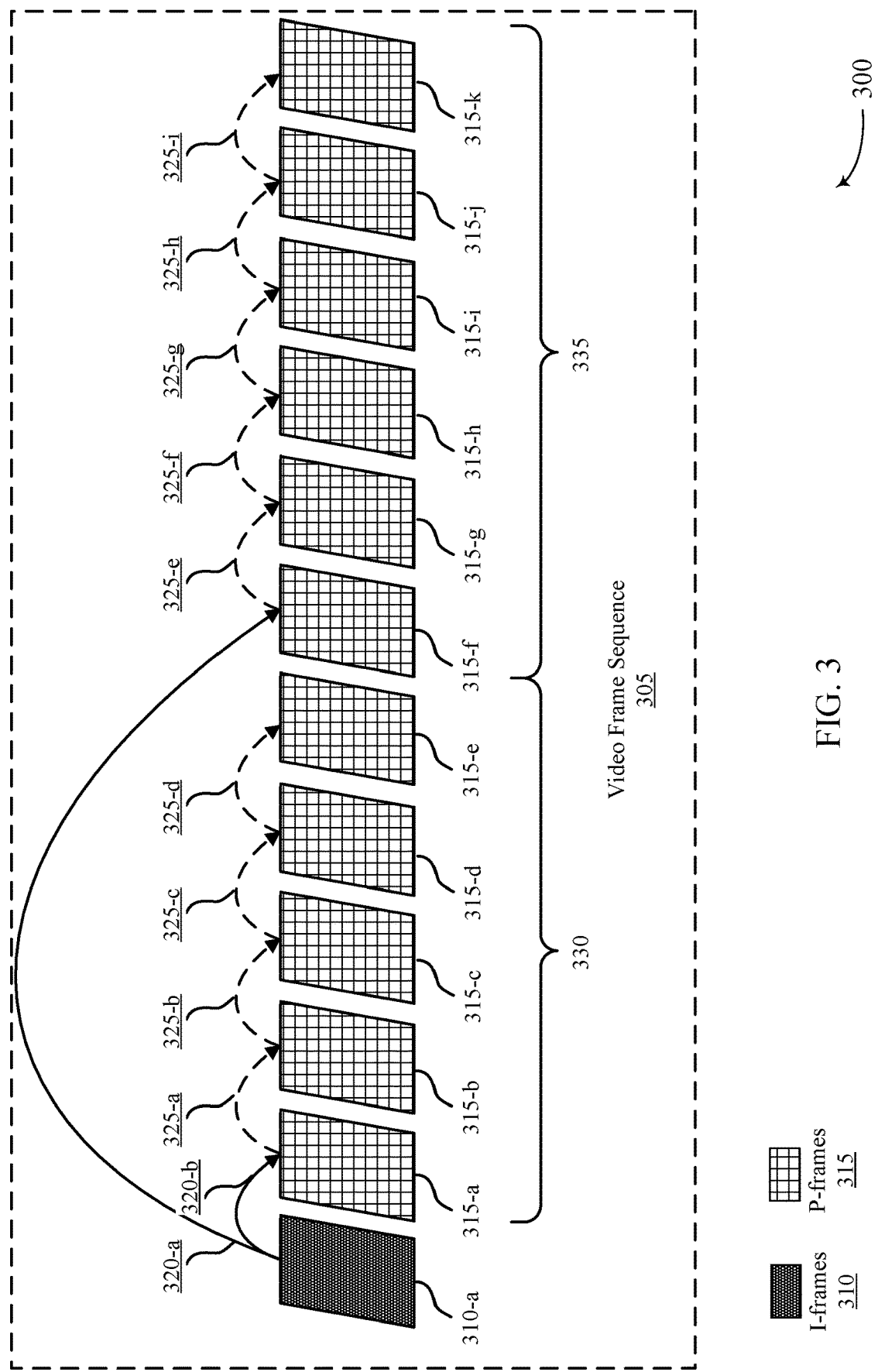
FIG. 3 illustrates an example of a video data stream that supports improved video throughput using deep learning video coding in accordance with aspects of the present disclosure.

FIG. 3 illustrates an example video data stream 300 that supports improved video throughput using deep learning video coding in accordance with aspects of the present disclosure. In some examples, video data stream 300 may be implemented by aspects of wireless communication system 100 and wireless communication system 200, which may provide improvements to video frame rendering and video throughput using deep learning video coding. In some examples, video data stream 300 may be implemented by aspects of device 115 described with reference to FIG. 1. In some examples, video data stream 300 may be implemented by aspects of device 115-*a* and device 115-*b* described with reference to FIG. 2. Video data stream 300 may include example aspects of video data stream 205.

Video data stream 300 may include a video frame sequence 305. In some aspects, video data stream 300 (e.g., video frame sequence 305) may include video frames captured, for example, by a capturing component (e.g., a camera) of device 115-*a*. Video data stream 300 may be, for example, a coded bitstream generated by encoding video frame sequence 305 at device 115-*a*. For example, device 115-a may encode video frame sequence 305 using encoding component 210-a and machine learning component 215-a described herein. Video frame sequence 305 may include I-frames 310 and P-frames 315. Device 115-a may generate and transmit video data stream 300 (including the video frame sequence 305) to device 115-b. Example aspects of encoding video frames of video frame sequence 305 and generating video data stream 300 are described with reference to FIG. 4.

Device 115-b may receive video data stream 300 and generate a set of video frames from the video data stream 300. For example, device 115-b may decode video data stream 300 (e.g., decode packets of the video data stream 300) using decoding component 211-b and machine learning component 215-b, and in some examples, generate one or more of I-frames 310 and P-frames 315 of the video frame sequence 305 from decoding video data stream 300. In some aspects, device 115-b may output video frames (e.g., I-frames 310, P-frames 315) for display at device 115-b, for example, via a display of the device 115-b. Example aspects of decoding video data stream 300 and generating video frames of video frame sequence 305 are described with reference to FIG. 5.

Example of aspects described herein may incorporate long-term referencing techniques, skip frame logic, frame generation techniques using a neural processing unit, and load balancing techniques. In some aspects of video frame sequence 305, P-frame 315-a (e.g., at a time T−1) may be a reference frame for generating P-frame 315-b (e.g., at a time T), as indicated by arrow 325-a. In some other aspects, I-frame 310-a may be a reference frame for generating P-frame 315-a, as indicated by arrow 320-b. In some aspects of long-term referencing, I-frame 310-a may be marked as a long-term reference frame, for example, for generating P-frame 315-f, as indicated by arrow 320-a. Arrows 320 and 325 may indicate dependency relationships between a frame and a reference frame.

In long-term referencing, when a frame is marked as long-term reference frame at a time t, an I-frame at time T+t may be generated where t is time delta within a predefined threshold. For example, a long-term reference frame at a time t may be a reference frame for a P-frame within a time threshold T from the long-term reference frame. A long-term reference frame may include a larger amount of encoded image data compared to a regular reference frame (e.g., a non-long-term reference frame). The larger amount of encoded image data may provide for decoding a frame (e.g., a P-frame which refers to the long-term reference frame) without compromising the image quality.

As described herein, I-frame 310-a may be referred to as a long-term reference frame. The first frame of a batch (e.g., subset 330 processed by neural processing unit hardware) may be generated using the long-term reference frame. In order to regenerate the frame more accurately, the long-term reference frame may be associated with more image data for correct decoding. In some examples, the first frame (e.g., of subset 335) for neural processing unit hardware may be generated using a long-term reference frame from the previous batch (e.g., subset 330) for video hardware.

Regarding skip frames, during an encoding process for encoding video frame sequence 305, each video frame (e.g., I-frame 310-a and P-frames 315-a through 315-k) may be reconstructed to generate motion vectors between video frames of the video frame sequence 305. In cases in which a change in an image scene (e.g., a reference scene) between a reference frame and a frame dependent on the reference frame is within a given threshold (e.g., motion displacement vector information between the video frames is less than a threshold), the frame dependent on the reference frame may be marked as a skip frame. In an example in which motion displacement vector information between I-frame 310-a and P-frame 315-a (dependent on I-frame 310-a) is less than a threshold), then P-frame 315-a may be marked as a skip frame. In an example in which motion displacement vector information between I-frame 310-a and P-frame 315-b (dependent on I-frame 310-a) is less than a threshold), then P-frame 315-b may be marked as a skip frame. In an example in which motion displacement vector information between P-frame 315-a and P-frame 315-b (dependent on P-frame 315-a) is less than a threshold), then P-frame 315-b may be marked as a skip frame.

According to examples of aspects described herein, device 115-b may receive a bitstream (e.g., video data stream 300) including a set of video frames (e.g., video frame sequence 305). Device 115-b may include a video processing unit (e.g., video hardware) and a neural processing unit (e.g., machine learning component 215-b, which may be integrated with encoding component 210-b and decoding component 211-b). A neural processing unit may generally refer to any GPU or hardware capable of processing/implementing neural networks. Device 115-b may batch (e.g., using the decoding component 211-b) the set of video frames into a first subset of video frames (e.g., subset 330) and a second subset of video frames (e.g., subset 335) based on a change in a reference scene (e.g., based on motion vector information) associated with the set of video frames. In some examples, the grouping/batching may be based on a group of pictures, a scene change, a long-term reference frame, heuristics, etc. In an example, device 115-b may select a mode of operation for the neural processing unit (e.g., machine learning component 215-b) based on the batching. Device 115-b may generate the first subset of video frames using the video processing unit and generate the second subset of video frames using the neural processing unit. Device 115-b may generate and output a set of video packets including the subsets of video frames.

In some aspects, device 115-b may identify a long-term reference frame (e.g., I-frame 310-a) of the set of video frames. Device 115-b may batch the set of video frames into the first subset of video frames (e.g., subset 330) and the second subset of video frames (e.g., subset 335) based on the long-term reference frame. For example, device 115-b may perform the batching based on header information included in the video data stream 300. In an example, the header information may indicate long-term reference frames. In some cases, the header information may indicate frames dependent on the long-term reference frames. In an example, using the neural processing unit (e.g., machine learning component 215-b), device 115-b may generate a first frame of the second subset of video frames based on the long-term reference frame (e.g., device 115-b may generate P-frame 315-f of subset 335 based on I-frame 310-a).

As described herein, load balancing techniques may be implemented to efficiently utilize both the video hardware and neural processing unit hardware of the device (e.g., where batches may be load balanced for increases in fps, hardware capability, etc.). For instance, in an example where a batch (e.g., or subset of frames) includes 5 frames, a first batch after every scene change may be processed by video hardware (e.g., the first five frames may be generated using video hardware). The device may generally decide the hardware (e.g., video hardware or neural processing unit hardware) based on the header parsing (e.g., of the one or more frames). If video hardware is selected and first batch after scene change, the neural processing unit hardware may operate in a learning mode. If the neural processing unit hardware is selected, the neural processing unit hardware may be switched to generation mode. If the Nth batch is given to the neural processing unit hardware then the first frame of the N+1 batch may be generated by a long-term reference frame. Output frames may be synchronized based on frame timestamp. In cases where a scene change is detected, the load balancing techniques may be repeated for the new frames associated with the scene change. Example aspects of load balancing techniques for generating the video frames using the video processing unit and the neural processing unit are described in further detail herein, for example, with reference to FIG. 5.

Figure 4:
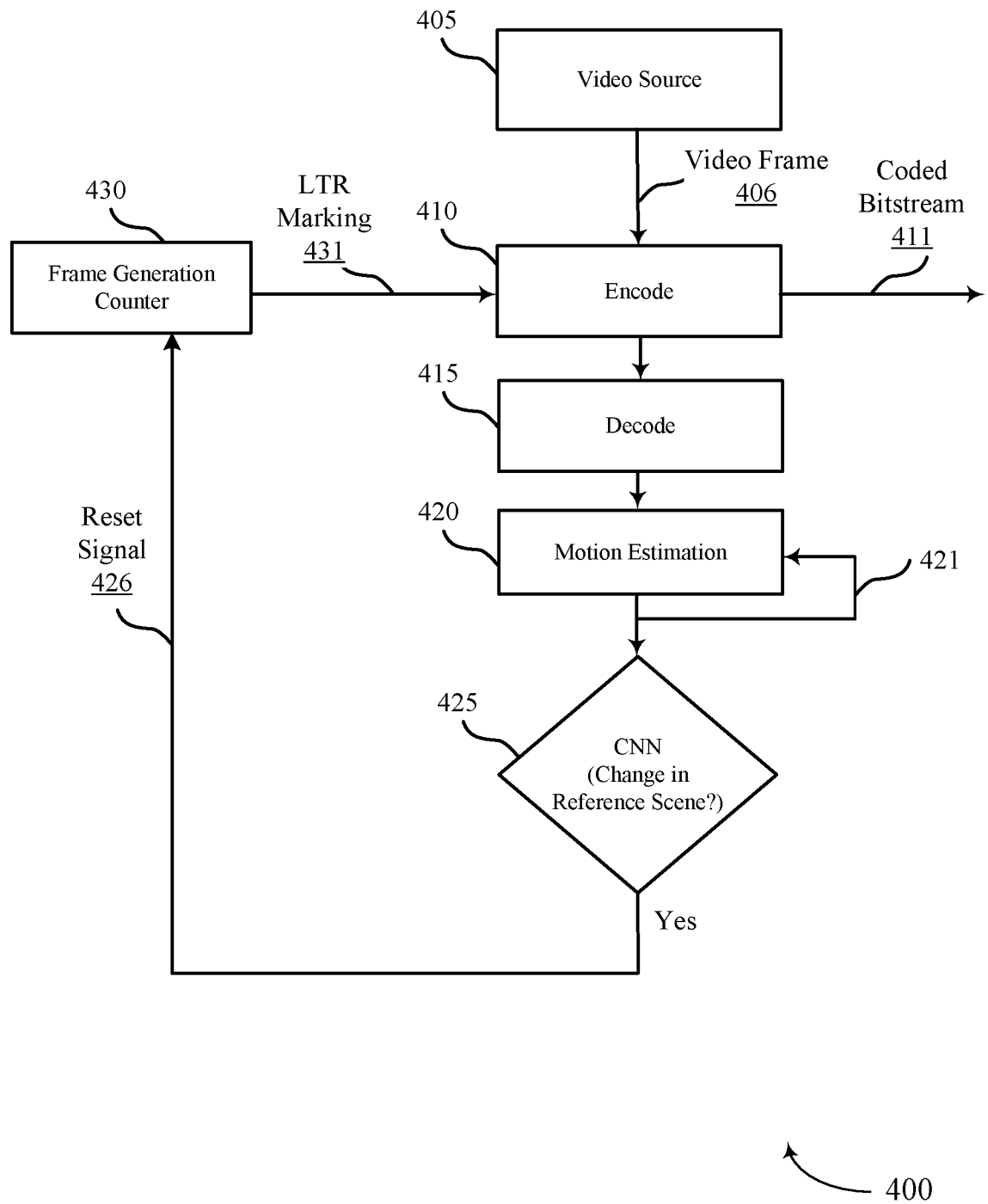
FIG. 4 illustrates an example of a process flow that supports improved video throughput using deep learning video coding in accordance with aspects of the present disclosure.

FIG. 4 illustrates an example of a process flow 400 that supports improved video throughput using deep learning video coding in accordance with aspects of the present disclosure. In some examples, the process flow 400 may implement aspects of wireless communication system 100 and wireless communication system 200.

The process flow 400 may be implemented, for example, by a device 115 (e.g., device 115-a in wireless communication with the device 115-b). The process flow 400 may be implemented by a processor of the device 115. In some aspects, the process flow 400 may include an encoder model and an integrated learning model. Process flow 400 may be implemented by aspects of encoding component 155 (e.g., encoding component 210-a). In some aspects, process flow 400 may be described with reference to video frame sequence 305 of FIG. 3.

According to aspects of the process flow 400, the device 115 (e.g., the device 115-a) may process a set of video frames. The set of frames may include video frames captured, for example, by a capturing component (e.g., a camera) of the device 115. For example, the set of frames may include video frames associated with video captured by the capturing component (e.g., a camera) of the device 115.

In an example, at 410, the device 115 may receive a set of video frames from a video source 405. The video source 405 may be, for example, a video image source associated with YUV color encoding (e.g., wherein YUV color encoding may store the brightness (luminance) as the Y value, and the color (chrominance) as U and V values). The video source 405 may be, for example, a video image source, such as the capturing component (e.g., a camera) of the device 115 or a storage device of a device 115. In an example, the set of video frames may be YUV frames. The device 115 may generate and output a coded bitstream 411 based on the video frames, for example, using an encoder (e.g., encoding component 155). The coded bitstream 411 may include a set of I-frames (e.g., I-frames 310) and P-frames (e.g., P-frames 315). For example, the coded bitstream 411 may include aspects of video data stream 300 of FIG. 3. In an example, the device 115 may identify an input frame (an input video frame 406) for encoding, for example, from the set of a video frames. The video frame 406 may be, for example, a current video frame. The video frame 406 may be, for example, a P-frame (e.g., P-frame 315).

At 415, the device 115 may process (e.g., decode) image data associated with video frames (e.g., video frame 406) output from the video source 405. In some aspects, the device 115 may process (e.g., decode) the image data at a local decoder included within encoding component 155. In some aspects, processing the image data associated with the video frames may include processing macroblocks of the video frames.

At 420, the device 115 may estimate motion vector information of the video frames (e.g., video frame 406) based on the processed image data (e.g., based on the macroblocks of the video frames). The device 115 may estimate motion vector information of the video frame 406, for example, with respect to another frame (e.g., a reference frame) of the set of video frames. The reference frame may be a preceding reference frame with respect to the current video frame. For example, the reference frame may be a preceding I-frame 310 or a preceding P-frame 315.

The device 115 may perform motion estimation to compare macroblocks in the reference frame against macroblocks in the video frame 406. In some aspects, the device 115 may perform one or more block matching algorithms to identify macroblocks in the reference frame matching the macroblocks in the video frame 406, for example, based on image data (e.g., based on pixels of macroblocks in the reference frame and the video frame 406). In some aspects, at 420, the device 115 may determine or estimate motion vector information of video frames based on comparing the macroblocks. In an example, the device 115 may determine motion vector information of the video frame 406 and the reference frame.

At 425, the device 115 may process the motion vector information using, for example, on-chip neural processing. In some aspects, the on-chip neural processing by the device 115 may include using a learning model. The learning model, for example, may be implemented as part of a learning network included in the device 115 (e.g., machine learning component 155, machine learning component 215-a). The learning network, for example, may include a machine learning network, a neural network, a deep neural network, an LSTM network, or a convolutional neural network. The learning network may include, for example, a combination of machine learning layers (e.g., convolutional layers, LSTM layers).

In some aspects, using the on-chip neural processing, the device 115 may identify a change in a reference scene (e.g., between the video frame 406 and the reference frame) based on the motion vector information. For example, the device 115 may determine a difference between motion vector information associated with the video frame 406 and motion vector information associated with the reference frame. In some aspects, the device 115 may identify the change in the reference scene based on the determined difference satisfying a threshold (e.g., an accuracy threshold).

In an example in which the device 115 (e.g., using the on-chip neural processing) determines the difference exceeds the threshold, the device 115 may generate a reset signal 426 with respect to the video frame 406 and the reference frame. The device 115 may output the reset signal 426 to a frame generation counter. In an example, at 430, the device 115 (e.g., using the frame generation counter) may mark the reference frame as a long-term reference frame. The frame generation counter may output an long-term reference (LTR) marking 431 to the encoder indicating the reference frame as a long-term reference frame.

In some examples, at 410, the device 115 (e.g., using the encoder) may modify header information of the reference frame based on the LTR marking 431. For example, the device 115 may modify the header information to indicate the reference frame is a long-term reference frame. In some aspects, the device 115 may modify the header information of the video frame 406 to indicate the video frame 406 is associated with a long-term reference frame.

As described herein, device 115 (e.g., device 115-a) may identify a long-term reference frame of a set of video frames from video source 405, based on an accuracy threshold. The long-term reference frame may include an I-frame (e.g., I-frame 310) of the set of video frames.

Figure 5:
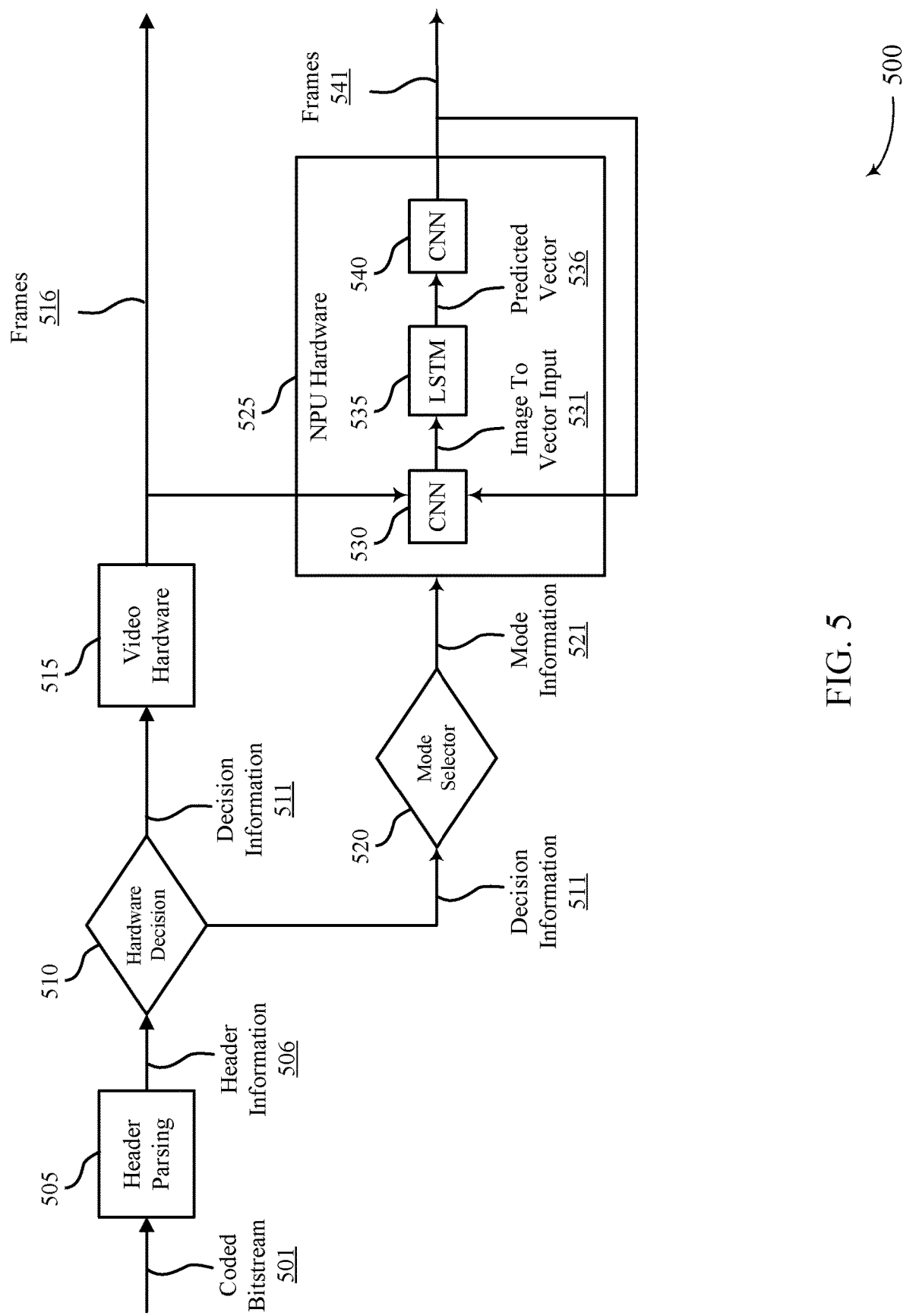
FIG. 5 illustrates an example of a process flow that supports improved video throughput using deep learning video coding in accordance with aspects of the present disclosure.

FIG. 5 illustrates an example of a process flow 500 that supports improved video throughput using deep learning video coding in accordance with aspects of the present disclosure. In some examples, the process flow 500 may support deep learning integrated into video coding. In some examples, the process flow 500 may implement aspects of wireless communication system 100 and wireless communication system 200.

The process flow 500 may be implemented, for example, by a device 115 (e.g., a device 115-b in wireless communication with the device 115-a). The process flow 500 may be implemented by a processor of the device 115. In some aspects, the process flow 500 may include a decoder model and an integrated learning model. Process flow 400 may be implemented by aspects of decoding component 155 (e.g., decoding component 210-b). Process flow 400 is described with reference to video frame sequence 305 of FIG. 3.

The device 115 (e.g., the device 115-b) may process a video data stream (e.g., a coded bitstream 501) received by the device 115. The coded bitstream 501 may include video frames captured, for example, by a capturing component (e.g., a camera) of another device 115 (e.g., the device 115-a). The coded bitstream 501 may be a bitstream generated by encoding at the other device 115, and for example, may include a set of video packets carrying the set of video frames. In some aspects, the device 115 may receive the coded bitstream 501 from the other device 115 via wireless communication or wired communication. Aspects of the coded bitstream 501 may include example aspects of the video data stream 300 and the coded bitstream 411 described herein.

At 505, the device 115 may decode the coded bitstream 501. In some examples, the device 115 may parse the coded bitstream 501. In some aspects, at 505, the device 115 may extract control information from the coded bitstream 501. The control information may be associated with video frames included in the coded bitstream 501. In some aspects, the control information may include header information 506. In some examples, the header information 506 may include an indication of a long-term reference frame (e.g., I-frame 310-a) and a P-frame 315 (e.g., P-frame 315-f) dependent on the long-term reference frame. In some examples, the control information may include batch information.

At 510, the device 115 (e.g., using decoding component 150) may batch video frames included in the coded bitstream 501 into a batch for video hardware (e.g., subset 330) and a batch for neural processing unit hardware (e.g., subset 335). In some aspects, the device 115 may determine the batches (and the number of video frames per batch) based on the header information 506 or batch information. For example, the device 115 may identify a change in a reference scene associated with the video frames based on the header information 506 (e.g., based on the indication of a long-term reference frame). The device 115 may output decision information 511 associated with the batches to the video hardware and to a mode selector associated with the neural processing unit hardware. In some aspects, the decision information 511 may include an operating mode for the neural processing unit hardware.

In an example, at 515, the device 115 may decode the first subset of video frames (e.g., subset 330) by the video hardware. The device 115 may output decoded video frames 516 (e.g., reconstructed video frames) of the first subset of video frames. During the decoding using the video hardware, the device 115 may train a learning model associated with the neural processing unit based on at least one of the decoded video frames 516.

For example, at 520, the device 115 may select a training mode for the neural processing unit based on the identified change in the reference scene. The identified change in the reference scene may be indicated, for example, in the decision information 511. In an example, the device 115 may output mode information 521 (indicating the training mode) to the neural processing unit, and the neural processing unit may switch to the training mode (e.g., if in a generation mode) or remain in the training mode (e.g., if already in the training mode) based on the mode information.

During the training mode, for example, the device 115 (e.g., the neural processing unit) may be trained based on the decoded video frames 516. For example, using convolution techniques at 530, LSTM techniques at 535, and convolutional techniques at 540, the device 115 may include features for learning each decoded video frame 516. In some aspects, the device 115 (e.g., the neural processing unit) may be trained based on motion vectors associated with the decoded video frames 516.

In another example, at 520, the device 115 may select a generation mode for the neural processing unit based on a frame count satisfying a threshold, the frame count including a number of frames following the identified change in the reference scene. For example, the frame count may be equal to the number of video frames decoded by the video hardware (e.g., the number of frames included in subset 330). In some aspects, at 520, the device 115 may determine to switch the mode of operation for the neural processing unit from the training mode to the generation mode based on the header information 506.

During the generation mode, for example at 525, the device 115 (e.g., the neural processing unit) may generate at least one video frame of the subset 335 based on the decoded video frames 516. For example, using convolution techniques at 530, LSTM techniques at 535, and convolutional techniques at 540, the device 115 may include features for generating or predicting video frames 541. In some aspects, the device 115 (e.g., the neural processing unit) may further be trained based on motion vectors associated with the decoded video frames 541. In some aspects, the first frame generated by the neural processing unit hardware from the subset 335 of video frames may be based on a long-term reference frame (e.g., the first frame generated by the neural processing unit hardware from the subset 335 is P-frame 315-f, which may be based on I-frame 310-a (a long-term reference frame)).

In some aspects, the video hardware (e.g., at 515) and the neural processing unit hardware (e.g., at 525) may generate video frames in non-sequential order with respect to video frame sequence 305. For example, the batch for video hardware (e.g., subset 330) may include video frames spanning a first time duration, and the batch for neural processing unit hardware (e.g., subset 335) may include video frames spanning a second time duration at least partially overlapping the first time duration. In an example, the decoded video frames 516 may be unsynchronized with respect to each other. In some examples, the decoded video frames 541 may be unsynchronized with respect to each other. In some other examples, the decoded video frames 516 and the decoded video frames 541 may be unsynchronized with respect to each other.

In some aspects, the coded bitstream 501, the header information 506, or the decision information 511 may include temporal information (e.g., timing or synchronization information, such as frame timestamps) associated with the video frames included in the batches. The device 115 may synchronize the first subset of video frames (e.g., subset 330), the second subset of video frames (e.g., subset 335), or both, based on the temporal information. The device 115 may output the video frames based on the synchronization. In cases where a new scene changes is detected, one or more aspects of the process flow 500 may be repeated for the new frames.

Figure 6:
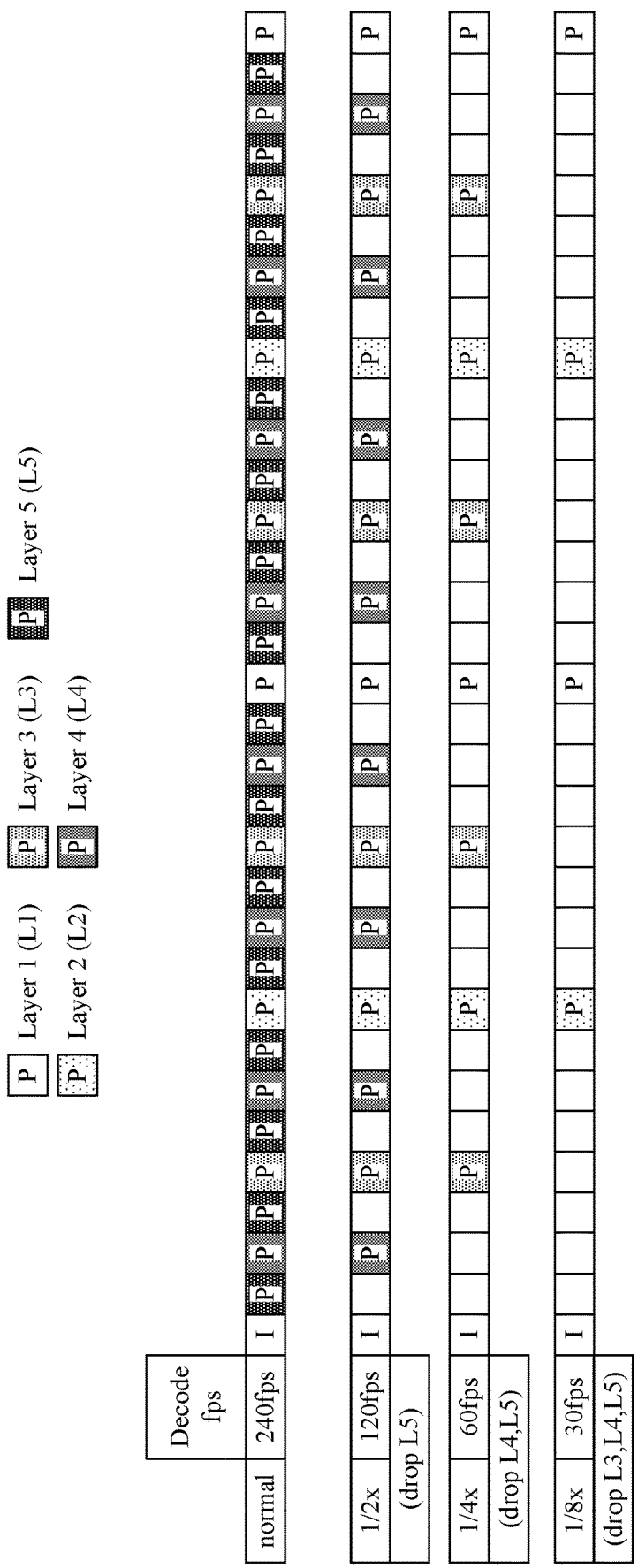
FIG. 6 illustrates an example of a temporal layer diagram that supports improved video throughput using deep learning video coding in accordance with aspects of the present disclosure.

FIG. 6 illustrates an example of a temporal layer diagram 600 that supports improved video throughput using deep learning video coding in accordance with aspects of the present disclosure. In some examples, the temporal layer diagram 600 may implement aspects of wireless communication system 100 and wireless communication system 200. Temporal layer diagram 600 may illustrate aspects of processing for devices including multiple (e.g., more than one) neural processing units for improved video throughput using deep learning video coding (e.g., where each layer may be processed by an individual neural processing unit based on inter-layer dependency).

As described herein, some devices may include the capability of on-chip neural processing (e.g., general neural processing hardware, which may include one or more neural processing units). According to the techniques described herein, such capabilities may be leveraged to enhance native video hardware capability by using neural processing unit hardware (e.g., which may provide for higher throughput, may accommodate video hardware with minimum capability, etc.). In some examples, additional throughput may be achieved using temporal layers and neural processing unit hardware, where each layer is processed by an individual neural processing unit model based on inter-layer dependency.

For high-resolution and high fps video playback video hardware may process large amounts of data. Some devices (e.g., device capable of on-chip neural processing that don't have capability for processing high fps video) may divide video frames (e.g., processing of video frames) in to multiple layers to support playback at lower fps without compromising user experience. To achieve increased fps, hardware (e.g., neural processing units) may be implemented to process all the layers. The temporal layer diagram 600 may illustrate the different layers (e.g., Layer 1 (L1), Layer 2 (L2), Layer 3 (L3), Layer 4 (L4), and Layer 5 (L5)) and various fps throughput that may be achieved via dropping different layers. In some examples, the decoding of a frame in a layer is dependent on the frame in the previous layer. As shown in example temporal layer diagram 600, dropping various layers (e.g., dropping L5, L4, L3, or some combination thereof) may reduce decoding fps.

Figure 7:
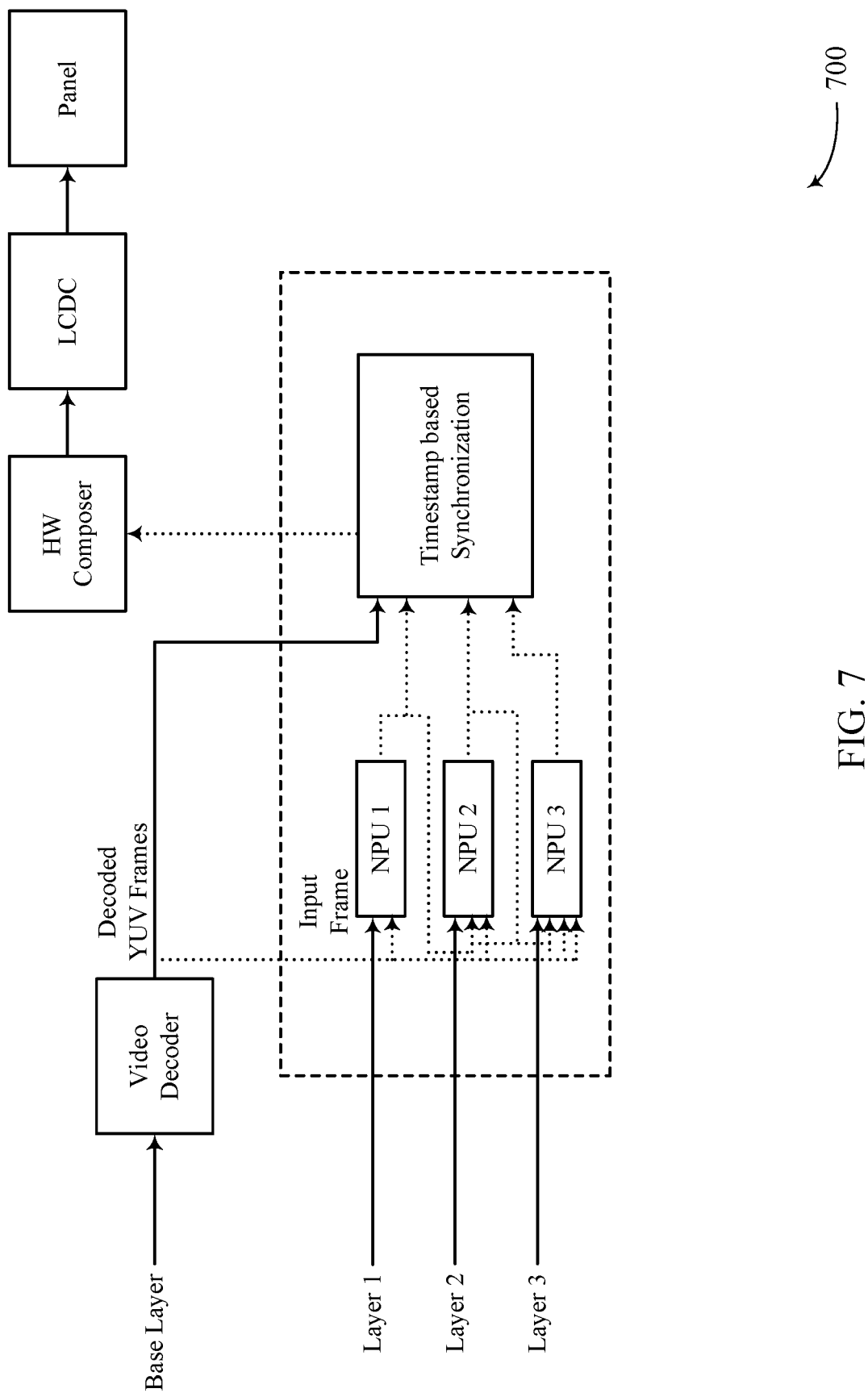
FIG. 7 illustrates an example of a neural processing unit cluster diagram that supports improved video throughput using deep learning video coding in accordance with aspects of the present disclosure.

FIG. 7 illustrates an example of a neural processing unit cluster diagram 700 that supports improved video throughput using deep learning video coding in accordance with aspects of the present disclosure. In some examples, the neural processing unit cluster diagram 700 may implement aspects of wireless communication system 100 and wireless communication system 200 (e.g., and aspects of temporal layer diagram 600). Neural processing unit cluster diagram 700 may illustrate aspects of processing for devices including multiple (e.g., more than one) neural processing units for improved video throughput using deep learning video coding (e.g., where, in some cases, each layer may be processed by an individual neural processing unit (NPU) based on inter-layer dependency).

Some devices may process all layers via video hardware. However, according to the techniques described herein, some devices (e.g., device capable of on-chip neural processing) may include a neural processing unit hardware (e.g., including a neural processing unit cluster), where single cluster may have multiple processing units (e.g., some devices may include neural processing unit hardware comprising multiple neural processing units). According to the techniques described herein, devices may implement a model which will allow devices to process different layers (e.g., video processing layers) via a neural processing unit cluster.

For example, as shown in neural processing unit cluster diagram 700, the neural processing unit cluster (e.g., including NPU1, NPU2, and NPU3) may use the frames decoded using video hardware. In the present example, neural processing unit 700 may illustrate a model for decoding via three layers. For a frame at a given level LN, the frame may reference only frames from higher layers (e.g., L0 . . . LN−1). Frames of each layer (e.g., starting from the lowest layer LN) may be dropped without decoding to achieve different playback rates (e.g., as described in more detail herein, for example, with reference to FIG. 6). In some examples, the number of neural processing units in a neural processing unit cluster may determine the number of temporal layers supported.

In neural processing unit cluster diagram 700, a base layer of video frames may be processed by a video decoder. For instance, a base layer of video frames (e.g., incoming frames of a bitstream) may be split into layers (e.g., groups of input frames) for processing by a neural processing unit cluster of the device. The video frames may then be processed via three temporal layers, where each layer may be processed by respective neural processing unit. For instance, the video decoder may output input frames to each of the neural processing units included in the device (e.g., each neural processing unit of the cluster of neural processing unit hardware of the device). The device may then synchronize output of the processing layers (e.g., via timestamps associated with the frames processed via the layers by the respective neural processing units. As such, a hardware (HW) composer may process the synchronized frames for output to a liquid crystal display controller (LCDC) (e.g., where the LCDC may ultimately control output to a display panel).

Generally, the HW composer may provide two primitives, layers and displays, to represent composition work and its interaction with the display hardware. The HW composer and/or the LCDC may process synchronized frames based on display hardware of the device (e.g., such as resolution configurations, color modes, etc.). In some examples, the LCDC may convert various types of video signal to a format supported by the display hardware of the device.

The techniques described herein may provide for parallel processing of data which may increase throughput, reduce video hardware complexity, reduce video hardware processing overhead, etc. Further, one or more aspects of the described techniques may provide for leveraging of a temporal layer model (e.g., which may reduce or eliminate constraints to process frames at fixed fps, via dropping of layers as described herein). The techniques described herein may consider both video hardware and NPU generated frames, which may improve quality (e.g., compared to techniques where frames are generated using neural processing unit frames for reference only which may compromise the quality). The techniques described may provide for increased throughput as multiple hardware (e.g., video hardware and neural processing unit hardware) may be implemented to process the data simultaneously. Load balancing techniques described herein may provide for improved utilization of both video hardware and neural processing unit hardware. Further, one or more aspects of the described techniques may be implemented at both an encoder (e.g., for a transmitting device) and at decoder (e.g., for a receiving device).

Figure 8:
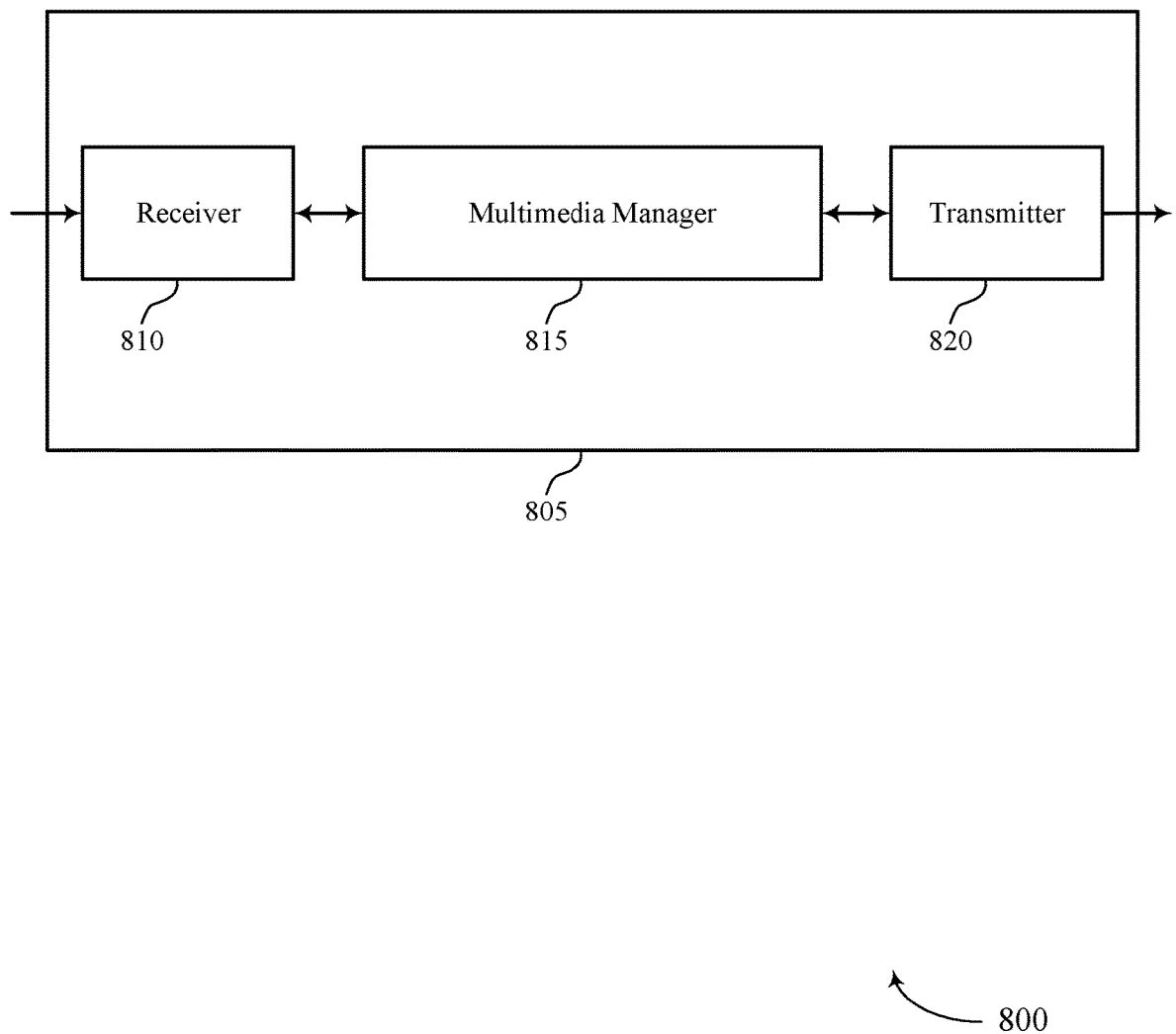
FIGS. 8 and 9 show block diagrams of devices that support improved video throughput using deep learning video coding in accordance with aspects of the present disclosure.

FIG. 8 shows a block diagram 800 of a device 805 that supports improved video throughput using deep learning video coding in accordance with aspects of the present disclosure. The device 805 may be an example of aspects of a device as described herein. The device 805 may include a receiver 810, a multimedia manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to improved video throughput using deep learning video coding, etc.). Information may be passed on to other components of the device 805. The receiver 810 may be an example of aspects of the transceiver 1120 described with reference to FIG. 11. The receiver 810 may utilize a single antenna or a set of antennas.

The multimedia manager 815 may receive a bitstream including a set of video frames, batch the set of video frames into a first subset of video frames and a second subset of video frames based on a change in a reference scene associated with the set of video frames, select a mode of operation for a neural processing unit of the device based on the batching, and generate a set of video packets including the first subset of video frames, the second subset of video frames, or both, based on the neural processing unit and the selected mode of operation. The multimedia manager 815 may be an example of aspects of the multimedia manager 1110 described herein.

The multimedia manager 815, or its sub-components, may be implemented in hardware, code (e.g., software or firmware) executed by a processor, or any combination thereof. If implemented in code executed by a processor, the functions of the multimedia manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The multimedia manager 815, or its sub-components, may be physically located at various positions, including being distributed such that portions of functions are implemented at different physical locations by one or more physical components. In some examples, the multimedia manager 815, or its sub-components, may be a separate and distinct component in accordance with various aspects of the present disclosure. In some examples, the multimedia manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
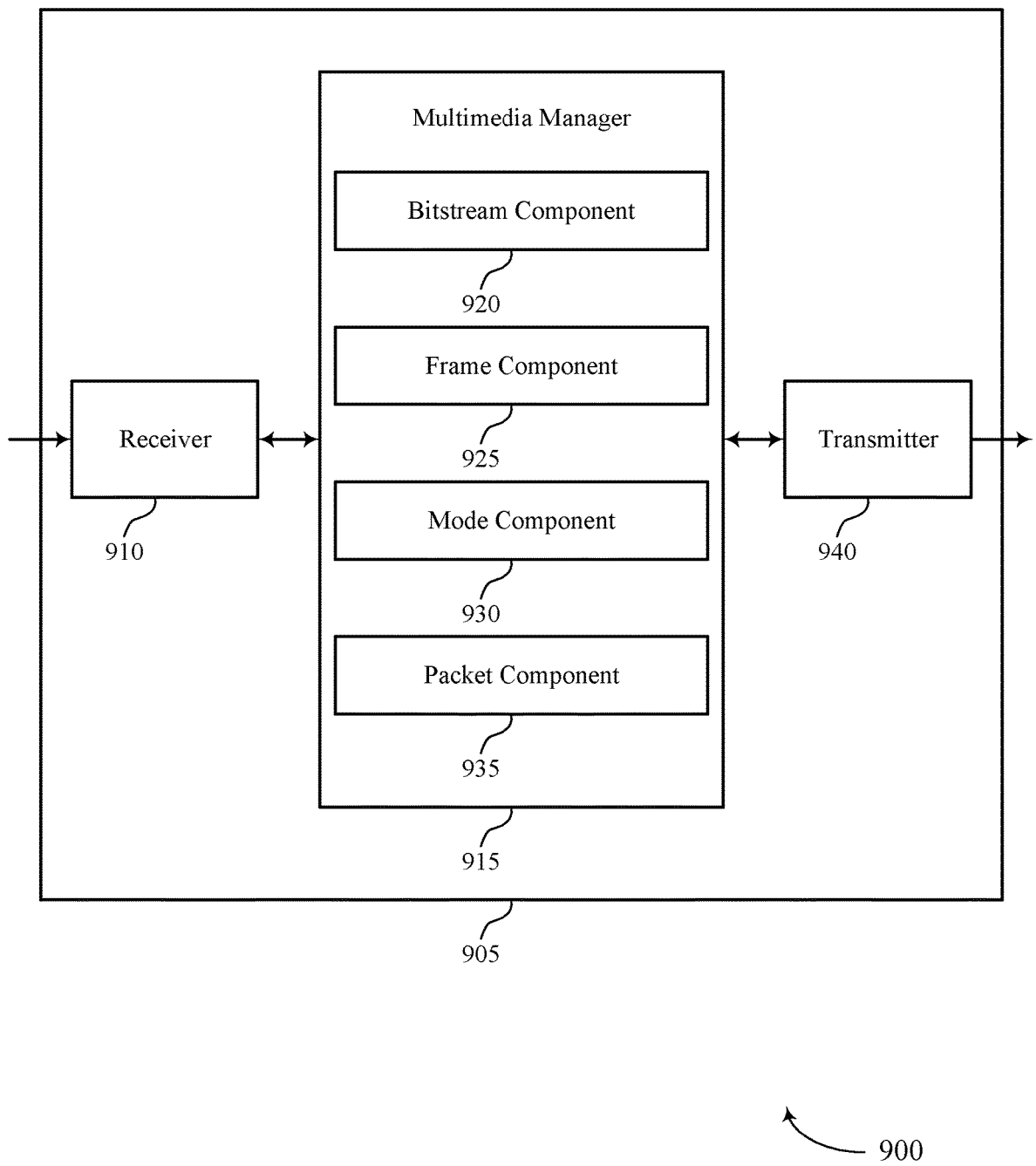

FIG. 9 shows a block diagram 900 of a device 905 that supports improved video throughput using deep learning video coding in accordance with aspects of the present disclosure. The device 905 may be an example of aspects of a device 805 or a device 115 as described herein. The device 905 may include a receiver 910, a multimedia manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to improved video throughput using deep learning video coding, etc.). Information may be passed on to other components of the device 905. The receiver 910 may be an example of aspects of the transceiver 1120 described with reference to FIG. 11. The receiver 910 may utilize a single antenna or a set of antennas.

The multimedia manager 915 may be an example of aspects of the multimedia manager 815 as described herein. The multimedia manager 915 may include a bitstream component 920, a frame component 925, a mode component 930, and a packet component 935. The multimedia manager 915 may be an example of aspects of the multimedia manager 1110 described herein.

The bitstream component 920 may receive a bitstream including a set of video frames. The frame component 925 may batch the set of video frames into a first subset of video frames and a second subset of video frames based on a change in a reference scene associated with the set of video frames. The mode component 930 may select a mode of operation for a neural processing unit of the device based on the batching. The packet component 935 may generate a set of video packets including the first subset of video frames, the second subset of video frames, or both, based on the neural processing unit and the selected mode of operation.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
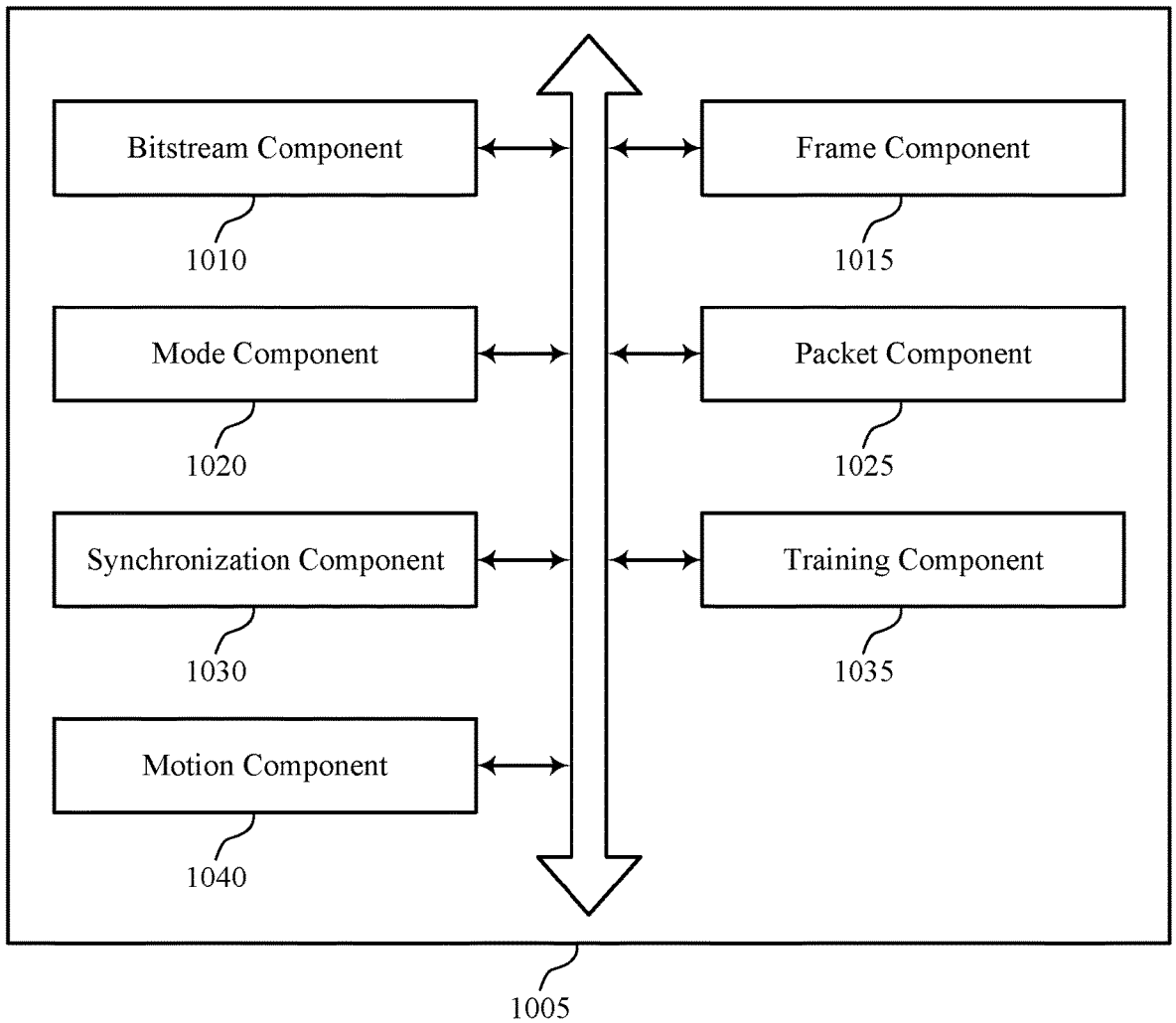
FIG. 10 shows a block diagram of a multimedia manager that supports improved video throughput using deep learning video coding in accordance with aspects of the present disclosure.

FIG. 10 shows a block diagram 1000 of a multimedia manager 1005 that supports improved video throughput using deep learning video coding in accordance with aspects of the present disclosure. The multimedia manager 1005 may be an example of aspects of a multimedia manager 815, a multimedia manager 915, or a multimedia manager 1110 described herein. The multimedia manager 1005 may include a bitstream component 1010, a frame component 1015, a mode component 1020, a packet component 1025, a synchronization component 1030, a training component 1035, and a motion component 1040. Each of these modules may communicate, directly or indirectly, with one another (e.g., via one or more buses).

The bitstream component 1010 may receive a bitstream including a set of video frames.

The frame component 1015 may batch the set of video frames into a first subset of video frames and a second subset of video frames based on a change in a reference scene associated with the set of video frames. In some examples, the frame component 1015 may identify a long-term reference frame of the set of video frames, where batching the set of video frames into a first subset of video frames and a second subset of video frames is based on identifying the long-term reference frame. In some examples, the frame component 1015 may generate the first subset of video frames using a video processing unit of the device. In some examples, generating the second subset of video frames using the neural processing unit of the device, where the generated set of video packets includes the generated first subset of video frames and the generated second subset of video frames.

In some examples, the frame component 1015 may generate a first frame of the second subset of video frames based on a long-term reference frame of the set of video frames. In some examples, the frame component 1015 may generate the first subset of video frames over a first time duration. In some examples, the frame component 1015 may generate the second subset of video frames over a second time duration, the first time duration at least partially overlapping in time with the second time duration. In some examples, the frame component 1015 may decode the first subset of video frames by a video processing unit of the device. In some examples, the frame component 1015 may decode the first subset of video frames using a video processing unit of the device. In some examples, the frame component 1015 may generate, using the neural processing unit of the device, at least one video frame of the second subset of video frames during the generation mode based on at least one decoded video frame of the decoded first subset of video frames.

In some examples, the frame component 1015 may batch the set of video frames is performed by a decoder of the device. In some examples, the frame component 1015 may identify a long-term reference frame of the set of video frames based on an accuracy threshold, the long-term reference frame including an intra-frame of the set of video frames. In some cases, the long-term reference frame is identified by an encoder of the device.

The mode component 1020 may select a mode of operation for a neural processing unit of the device based on the batching. In some examples, the mode component 1020 may identify the change in the reference scene. In some examples, the mode component 1020 may select a training mode for the neural processing unit based on the identified change in the reference scene. In some examples, the mode component 1020 may select a generation mode for the neural processing unit based on a frame count satisfying a threshold, the frame count including a number of frames following the identified change in the reference scene. In some examples, the mode component 1020 may determine to switch the mode of operation for the neural processing unit from the training mode to the generation mode based on header information associated with one or more frames of the set of video packets.

The packet component 1025 may generate a set of video packets including the first subset of video frames, the second subset of video frames, or both, based on the neural processing unit and the selected mode of operation. In some examples, the packet component 1025 may output the set of video packets based on the synchronization.

The synchronization component 1030 may synchronize the first subset of video frames, the second subset of video frames, or both, based on temporal information associated with the first subset of video frames and the second subset of video frames.

The training component 1035 may train a learning model associated with the neural processing unit during the training mode based on at least one decoded video frame of the decoded first subset of video frames. In some examples, the training component 1035 may train a learning model associated with the neural processing unit based on the first subset of video frames processed by a video processing unit of the device.

The motion component 1040 may estimate motion vector information associated with the set of video frames. In some examples, the motion component 1040 may identify the change in the reference scene based on the motion vector information and a learning model associated with the neural processing unit. In some examples, the motion component 1040 may determine a difference between first motion vector information associated with a first video frame of the set of video frames and second motion vector information associated with a second video frame of the set of video frames, where identifying the change in the reference scene is based on the determined difference.

Figure 11:
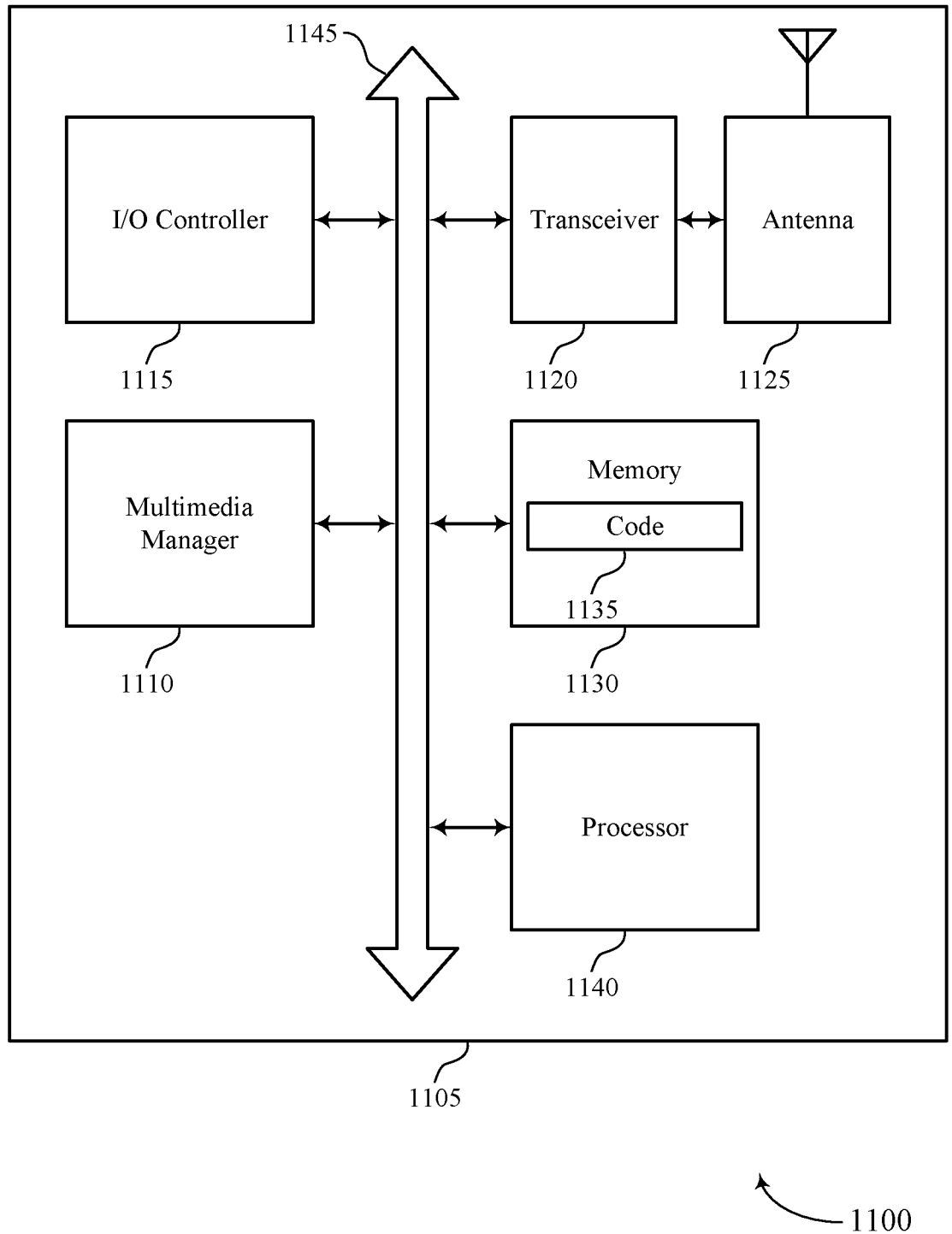
FIG. 11 shows a diagram of a system including a device that supports improved video throughput using deep learning video coding in accordance with aspects of the present disclosure.

FIG. 11 shows a diagram of a system 1100 including a device 1105 that supports improved video throughput using deep learning video coding in accordance with aspects of the present disclosure. The device 1105 may be an example of or include the components of device 805, device 905, or a device as described herein. The device 1105 may include components for bi-directional voice and data communications including components for transmitting and receiving communications, including a multimedia manager 1110, an I/O controller 1115, a transceiver 1120, an antenna 1125, memory 1130, a processor 1140, and a coding manager 1150. These components may be in electronic communication via one or more buses (e.g., bus 1145).

The multimedia manager 1110 may receive a bitstream including a set of video frames, batch the set of video frames into a first subset of video frames and a second subset of video frames based on a change in a reference scene associated with the set of video frames, select a mode of operation for a neural processing unit of the device based on the batching, and generate a set of video packets including the first subset of video frames, the second subset of video frames, or both, based on the neural processing unit and the selected mode of operation.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting improved video throughput using deep learning video coding).

The code 1135 may include instructions to implement aspects of the present disclosure, including instructions to support video processing. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
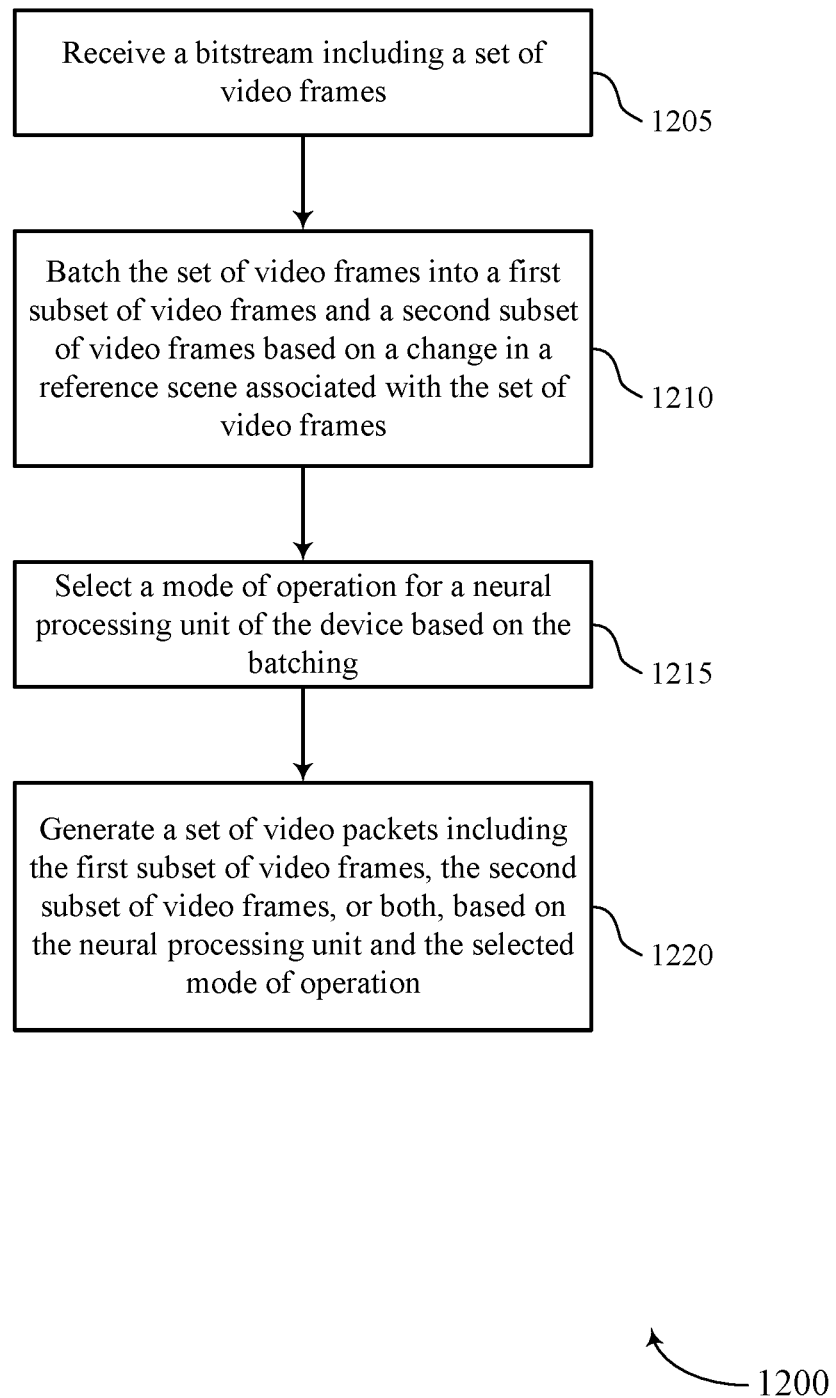
FIGS. 12 and 13 show flowcharts illustrating methods that support improved video throughput using deep learning video coding in accordance with aspects of the present disclosure.

FIG. 12 shows a flowchart illustrating a method 1200 that supports improved video throughput using deep learning video coding in accordance with aspects of the present disclosure. The operations of method 1200 may be implemented by a device or its components as described herein. For example, the operations of method 1200 may be performed by a multimedia manager as described with reference to FIGS. 8 through 11. In some examples, a device may execute a set of instructions to control the functional elements of the device to perform the functions described below. Additionally or alternatively, a device may perform aspects of the functions described below using special-purpose hardware.

At 1205, the device may receive a bitstream including a set of video frames. The operations of 1205 may be performed according to the methods described herein. In some examples, aspects of the operations of 1205 may be performed by a bitstream component as described with reference to FIGS. 8 through 11.

At 1210, the device may batch the set of video frames into a first subset of video frames and a second subset of video frames based on a change in a reference scene associated with the set of video frames. The operations of 1210 may be performed according to the methods described herein. In some examples, aspects of the operations of 1210 may be performed by a frame component as described with reference to FIGS. 8 through 11.

At 1215, the device may select a mode of operation for a neural processing unit of the device based on the batching. The operations of 1215 may be performed according to the methods described herein. In some examples, aspects of the operations of 1215 may be performed by a mode component as described with reference to FIGS. 8 through 11.

At 1220, the device may generate a set of video packets including the first subset of video frames, the second subset of video frames, or both, based on the neural processing unit and the selected mode of operation. The operations of 1220 may be performed according to the methods described herein. In some examples, aspects of the operations of 1220 may be performed by a packet component as described with reference to FIGS. 8 through 11.

Figure 13:
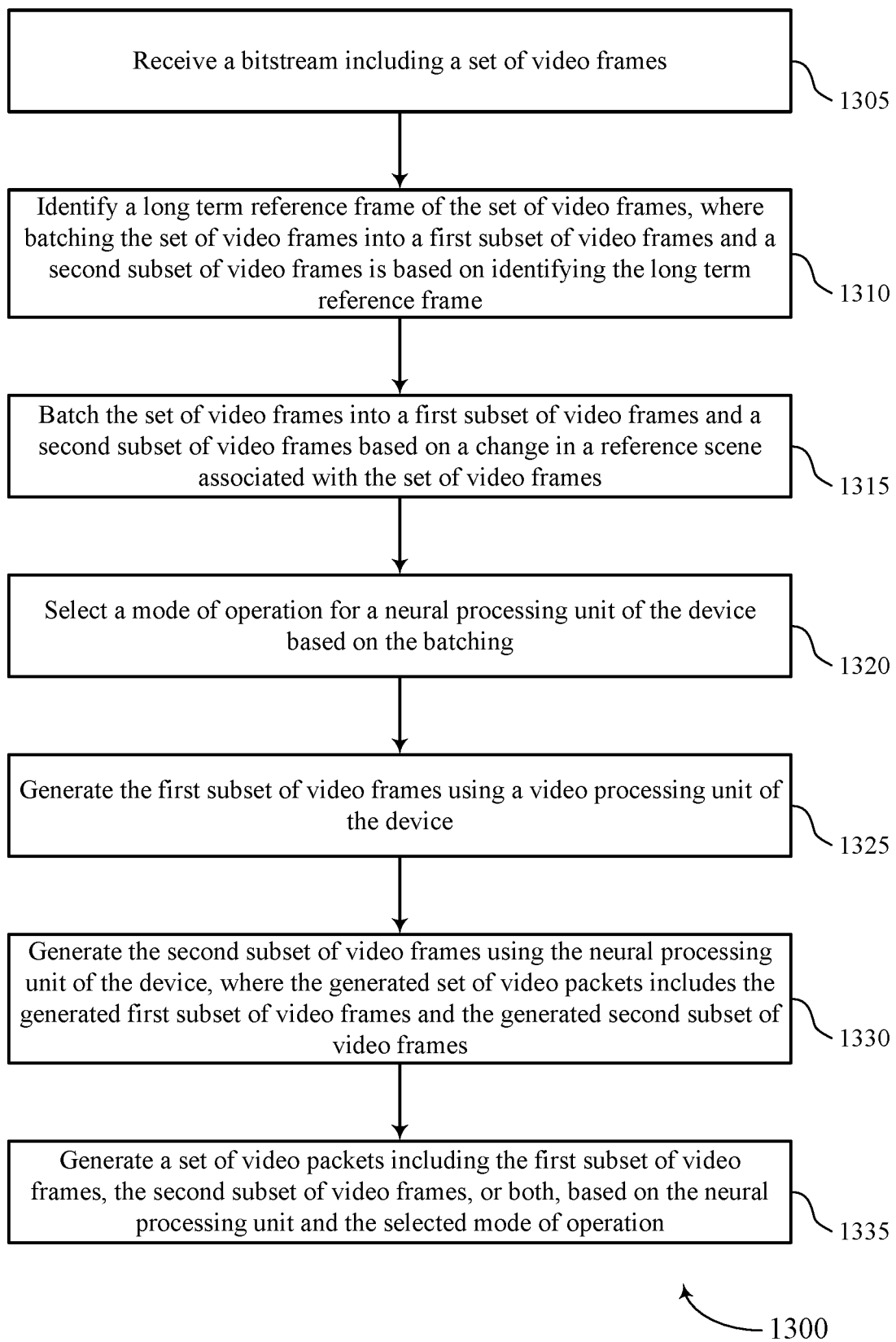

FIG. 13 shows a flowchart illustrating a method 1300 that supports improved video throughput using deep learning video coding in accordance with aspects of the present disclosure. The operations of method 1300 may be implemented by a device or its components as described herein. For example, the operations of method 1300 may be performed by a multimedia manager as described with reference to FIGS. 8 through 11. In some examples, a device may execute a set of instructions to control the functional elements of the device to perform the functions described below. Additionally or alternatively, a device may perform aspects of the functions described below using special-purpose hardware.

At 1305, the device may receive a bitstream including a set of video frames. The operations of 1305 may be performed according to the methods described herein. In some examples, aspects of the operations of 1305 may be performed by a bitstream component as described with reference to FIGS. 8 through 11.

At 1310, the device may identify a long-term reference frame of the set of video frames, where batching the set of video frames into a first subset of video frames and a second subset of video frames is based on identifying the long-term reference frame. The operations of 1310 may be performed according to the methods described herein. In some examples, aspects of the operations of 1310 may be performed by a frame component as described with reference to FIGS. 8 through 11.

At 1315, the device may batch the set of video frames into a first subset of video frames and a second subset of video frames based on a change in a reference scene associated with the set of video frames. The operations of 1315 may be performed according to the methods described herein. In some examples, aspects of the operations of 1315 may be performed by a frame component as described with reference to FIGS. 8 through 11.

At 1320, the device may select a mode of operation for a neural processing unit of the device based on the batching. The operations of 1320 may be performed according to the methods described herein. In some examples, aspects of the operations of 1320 may be performed by a mode component as described with reference to FIGS. 8 through 11.

At 1325, the device may generate the first subset of video frames using a video processing unit of the device. The operations of 1325 may be performed according to the methods described herein. In some examples, aspects of the operations of 1325 may be performed by a frame component as described with reference to FIGS. 8 through 11.

At 1330, the device may generate the second subset of video frames using the neural processing unit of the device, where the generated set of video packets includes the generated first subset of video frames and the generated second subset of video frames. The operations of 1330 may be performed according to the methods described herein. In some examples, aspects of the operations of 1330 may be performed by a frame component as described with reference to FIGS. 8 through 11.

At 1335, the device may generate a set of video packets including the first subset of video frames, the second subset of video frames, or both, based on the neural processing unit and the selected mode of operation. The operations of 1335 may be performed according to the methods described herein. In some examples, aspects of the operations of 1335 may be performed by a packet component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for video processing at a device, comprising:
  receiving a bitstream comprising a set of video frames;
  batching the set of video frames into separate batches of video frames, the batching comprising batching the set of video frames into a first subset of video frames and a second subset of video frames based at least in part on a change in a reference scene associated with the set of video frames, wherein the first subset of video frames comprises a first quantity of video frames after the change in the reference scene and the second subset comprises a second quantity of video frames following the first quantity of video frames and before a next change in the reference scene;

decoding the first subset of video frames using a video processing unit of the device;
selecting a training mode for a mode of operation for a neural processing unit based at least in part on the change in the reference scene, wherein training a learning model associated with the neural processing unit during the training mode is based at least in part on at least one decoded video frame of the decoded first subset of video frames;
selecting a generation mode for the mode of operation for the neural processing unit of the device based at least in part on the batching and header information associated with one or more frames of the first subset of video frames, the second subset of video frames, or both; and
generating, using the neural processing unit of the device, at least one video frame of the second subset of video frames during the generation mode based at least in part on at least one decoded video frame of the decoded first subset of video frames and the training of the learning model.

2. The method of claim 1, further comprising:
identifying a long-term reference frame of the set of video frames, wherein batching the set of video frames into the first subset of video frames and the second subset of video frames is based at least in part on identifying the long-term reference frame.

3. The method of claim 1, wherein generating the at least one video frame of the second subset of video frames using the neural processing unit comprises:
generating a first frame of the second subset of video frames based at least in part on a long-term reference frame of the set of video frames.

4. The method of claim 1, further comprising:
synchronizing the first subset of video frames, the second subset of video frames, or both, based at least in part on temporal information associated with the first subset of video frames and the second subset of video frames.

5. The method of claim 4, further comprising:
outputting the at least one video frame based at least in part on the synchronization.

6. The method of claim 1, wherein decoding the first subset of video frames and generating the at least one video frame of the second subset of video frames comprises:
decoding the first subset of video frames over a first time duration; and
generating the at least one video frame of the second subset of video frames over a second time duration, the first time duration at least partially overlapping in time with the second time duration.

7. The method of claim 1, further comprising:
identifying the change in the reference scene.

8. The method of claim 7, further comprising:
selecting the generation mode for the neural processing unit based at least in part on a frame count satisfying a threshold, the frame count comprising a quantity of frames following the identified change in the reference scene.

9. The method of claim 1, further comprising:
training the learning model associated with the neural processing unit based at least in part on the first subset of video frames decoded by the video processing unit of the device.

10. The method of claim 1, further comprising:
estimating motion vector information associated with the set of video frames; and
identifying the change in the reference scene based at least in part on the motion vector information and a learning model associated with the neural processing unit.

11. The method of claim 10, wherein estimating the motion vector information of the set of video frames comprises:
determining a difference between first motion vector information associated with a first video frame of the set of video frames and second motion vector information associated with a second video frame of the set of video frames, wherein identifying the change in the reference scene is based at least in part on the determined difference.

12. The method of claim 1, wherein:
batching the set of video frames is performed by a decoder of the device.

13. The method of claim 1, further comprising:
identifying a long-term reference frame of the set of video frames based at least in part on an accuracy threshold, the long-term reference frame comprising an intra-frame of the set of video frames.

14. The method of claim 13, wherein the long-term reference frame is identified by an encoder of the device.

15. An apparatus for video processing at a device, comprising:
a processor,
memory coupled with the processor; and
instructions stored in the memory and executable by the processor to cause the apparatus to:
receive a bitstream comprising a set of video frames;
batch the set of video frames into separate batches of video frames, the batching comprising batching the set of video frames into a first subset of video frames and a second subset of video frames based at least in part on a change in a reference scene associated with the set of video frames, wherein the first subset of video frames comprises a first quantity of video frames after the change in the reference scene and the second subset comprises a second quantity of video frames following the first quantity of video frames and before a next change in the reference scene;
decode the first subset of video frames using a video processing unit of the device;
select a training mode for a mode of operation for a neural processing unit based at least in part on the change in the reference scene, wherein training a learning model associated with the neural processing unit during the training mode is based at least in part on at least one decoded video frame of the decoded first subset of video frames;
select a generation mode for the mode of operation for the neural processing unit of the device based at least in part on the batching and header information associated with one or more frames of the first subset of video frames, the second subset of video frames, or both; and
generate, using the neural processing unit of the device, at least one video frame of the second subset of video frames during the generation mode based at least in part on at least one decoded video frame of the decoded first subset of video frames and the training of the learning model.

16. The apparatus of claim 15, wherein the instructions are executable by the processor to cause the apparatus to:

identify a long-term reference frame of the set of video frames, wherein batching the set of video frames into the first subset of video frames and the second subset of video frames is based at least in part on identifying the long-term reference frame.

17. The apparatus of claim 15, wherein, to generate the at least one video frame of the second subset of video frames using the neural processing unit, the instructions are executable by the processor to cause the apparatus to:
generate a first frame of the second subset of video frames based at least in part on a long-term reference frame of the set of video frames.

18. The apparatus of claim 15, wherein, to decode the first subset of video frames and generating the at least one video frame of the second subset of video frames, the instructions are executable by the processor to cause the apparatus to:
decode the first subset of video frames over a first time duration; and
generate the at least one video frame of the second subset of video frames over a second time duration, the first time duration at least partially overlapping in time with the second time duration.

19. The apparatus of claim 15, wherein the instructions are executable by the processor to cause the apparatus to:
identify the change in the reference scene; and
select the generation mode for the neural processing unit based at least in part on a frame count satisfying a threshold, the frame count comprising a quantity of frames following the identified change in the reference scene.

20. The apparatus of claim 15, wherein the instructions are executable by the processor to cause the apparatus to:
train the learning model associated with the neural processing unit based at least in part on the first subset of video frames decoded by the video processing unit of the device.

21. The apparatus of claim 15, wherein the instructions are executable by the processor to cause the apparatus to:
estimate motion vector information associated with the set of video frames; and
identify the change in the reference scene based at least in part on the motion vector information and a learning model associated with the neural processing unit.

22. The apparatus of claim 21, wherein, to estimate the motion vector information of the set of video frames, the instructions are executable by the processor to cause the apparatus to:
determine a difference between first motion vector information associated with a first video frame of the set of video frames and second motion vector information associated with a second video frame of the set of video frames, wherein identifying the change in the reference scene is based at least in part on the determined difference.

23. The apparatus of claim 15, further comprising:
a decoder configured to batch the set of video frames.

24. The apparatus of claim 15, wherein the instructions are executable by the processor to cause the apparatus to:
identify a long-term reference frame of the set of video frames based at least in part on an accuracy threshold, the long-term reference frame comprising an intra-frame of the set of video frames.

25. The apparatus of claim 24, further comprising:
an encoder configured to identify the long-term reference frame.

26. An apparatus for video processing at a device, comprising:
means for receiving a bitstream comprising a set of video frames;
means for batching the set of video frames into separate batches of video frames, the batching comprising batching the set of video frames into a first subset of video frames and a second subset of video frames based at least in part on a change in a reference scene associated with the set of video frames, wherein the first subset of video frames comprises a first quantity of video frames after the change in the reference scene and the second subset comprises a second quantity of video frames following the first quantity of video frames and before a next change in the reference scene;
means for decoding the first subset of video frames using a video processing unit of the device;
means for selecting a training mode for a mode of operation for a neural processing unit based at least in part on the change in the reference scene, wherein training a learning model associated with the neural processing unit during the training mode is based at least in part on at least one decoded video frame of the decoded first subset of video frames;
means for selecting a generation mode for the mode of operation for the neural processing unit of the device based at least in part on the batching and header information associated with one or more frames of the first subset of video frames, the second subset of video frames, or both; and
means for generating, using the neural processing unit of the device, at least one video frame of the second subset of video frames during the generation mode based at least in part on at least one decoded video frame of the decoded first subset of video frames and the training of the learning model.

* * * * *